Figure 1:
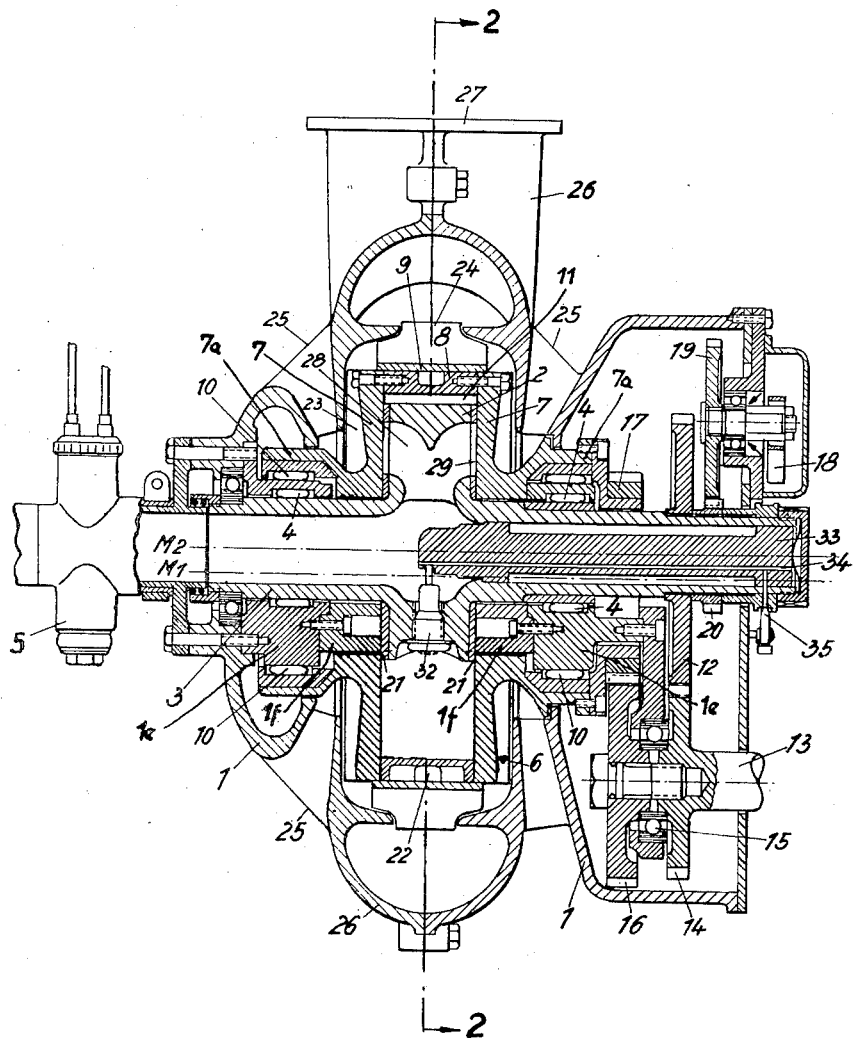

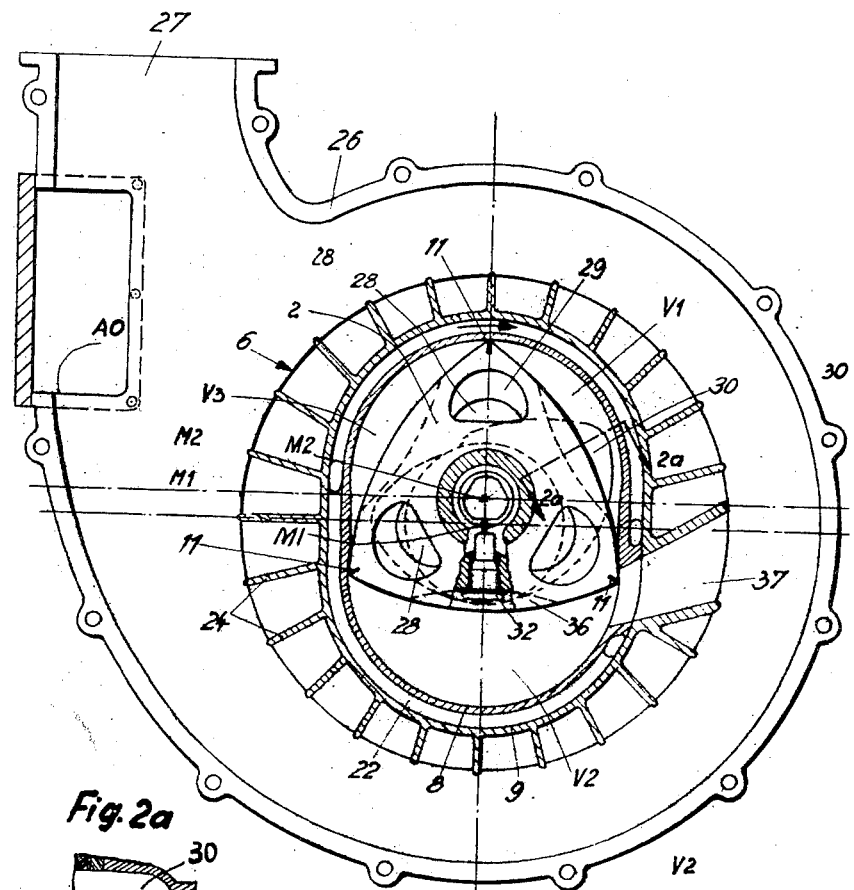
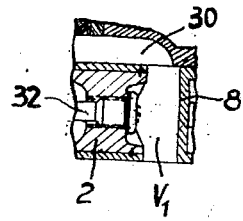
Fig. 2a
Fig. 2

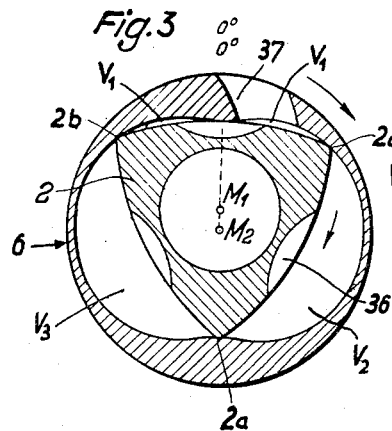
Fig. 3   0°
         0°
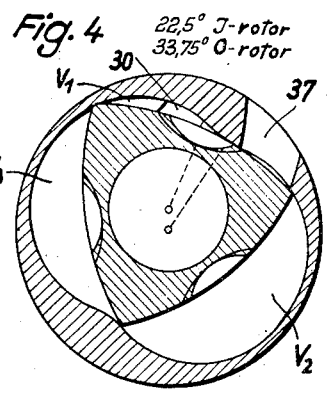
Fig. 4   22.5° J-rotor
         33.75° O-rotor
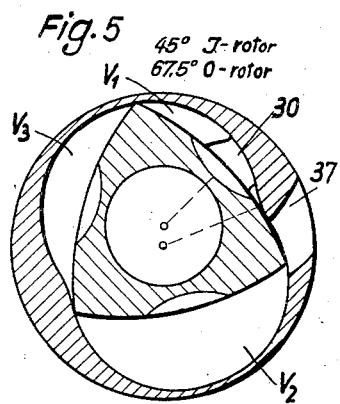
Fig. 5   45° J-rotor
         67.5° O-rotor
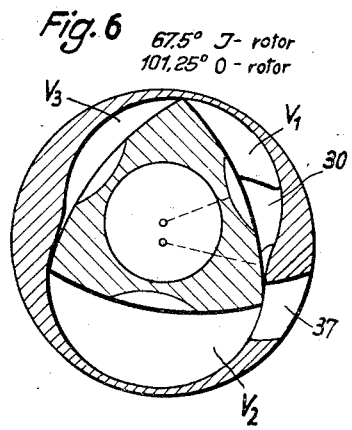
Fig. 6   67.5° J-rotor
         101.25° O-rotor
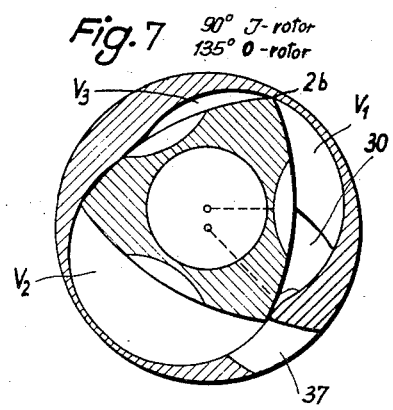
Fig. 7   90° J-rotor
         135° O-rotor
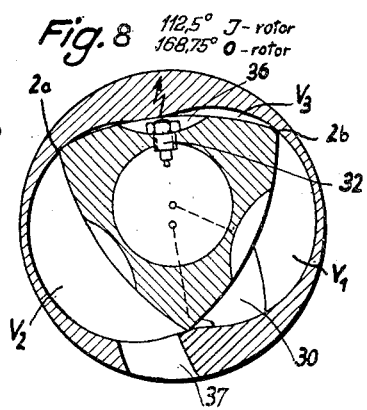
Fig. 8   112.5° J-rotor
         168.75° O-rotor

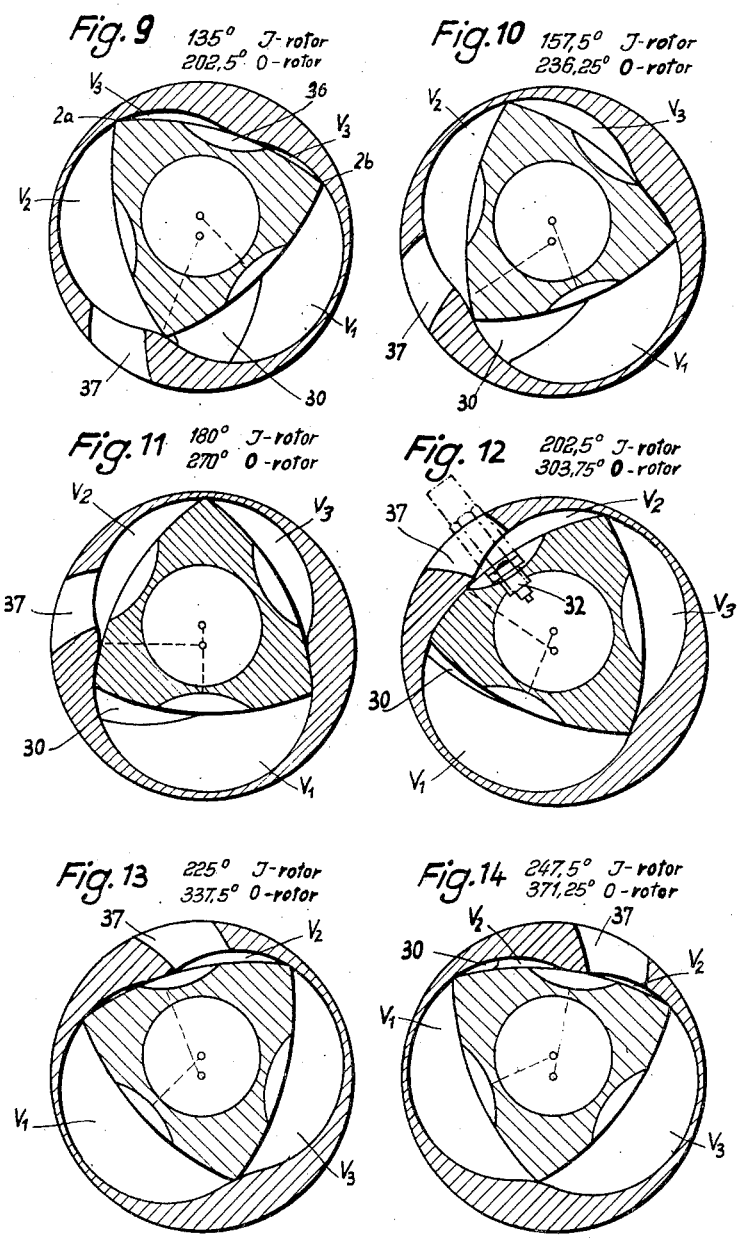

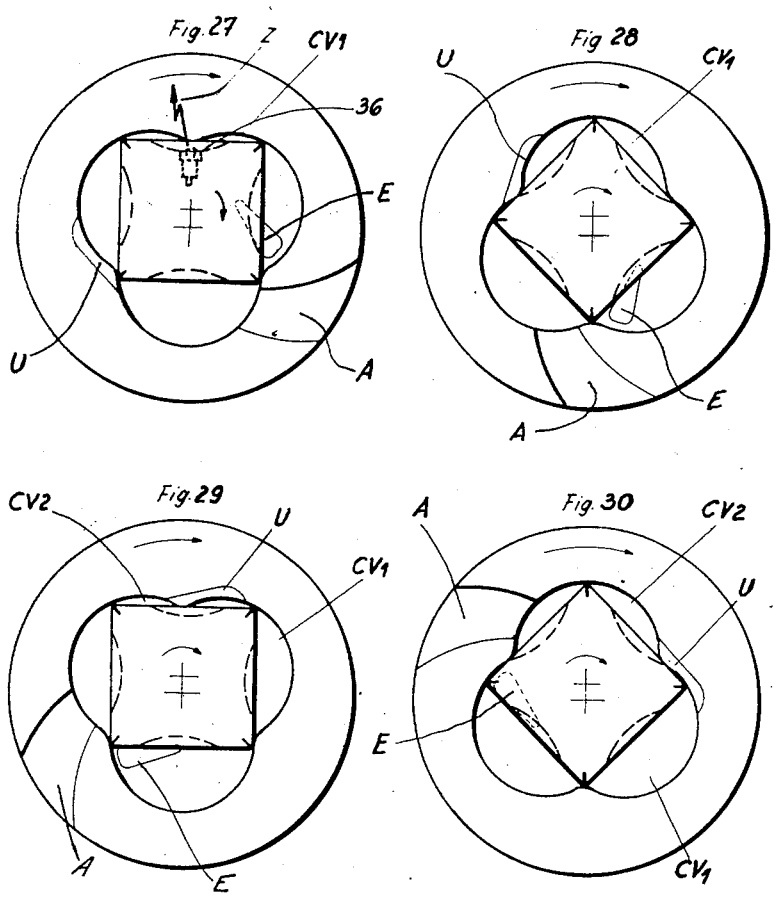

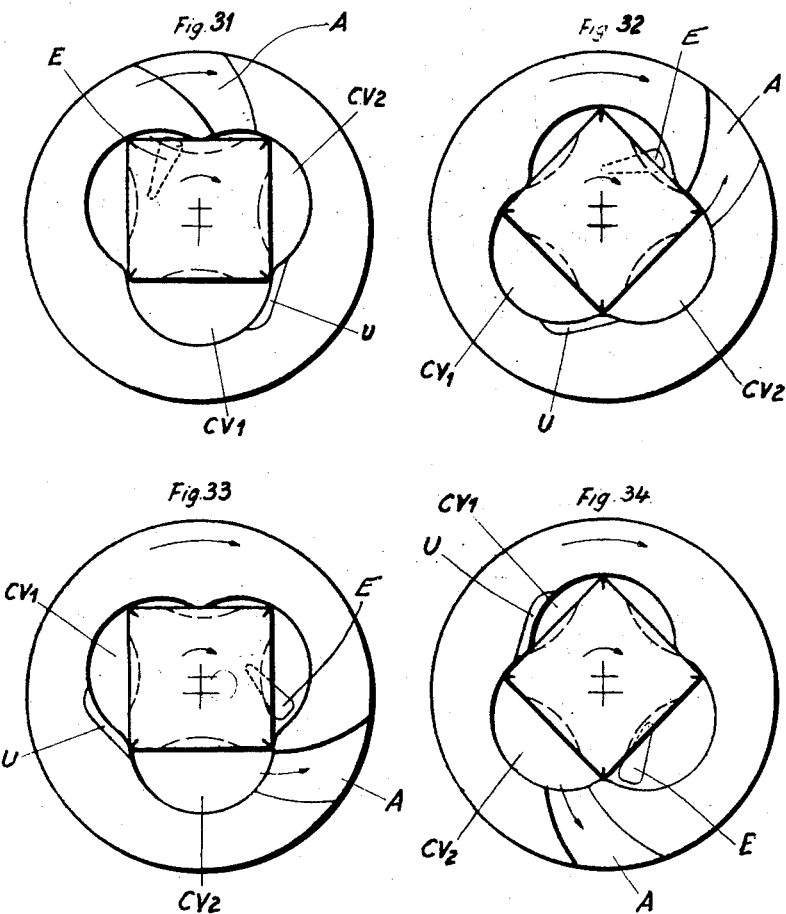

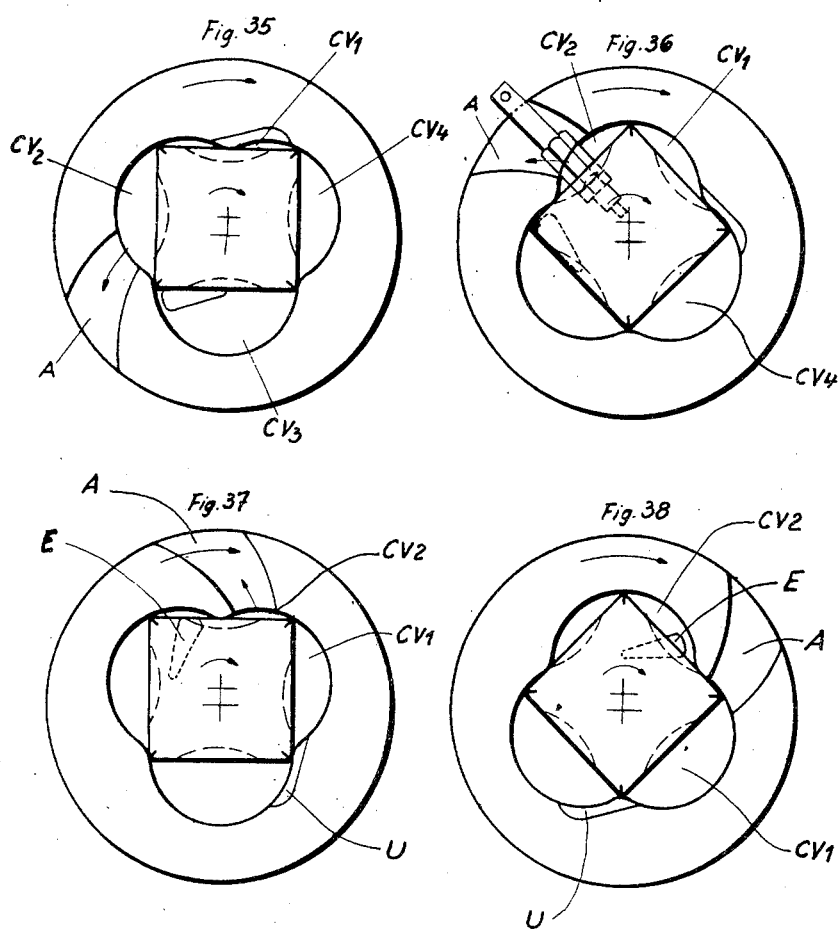

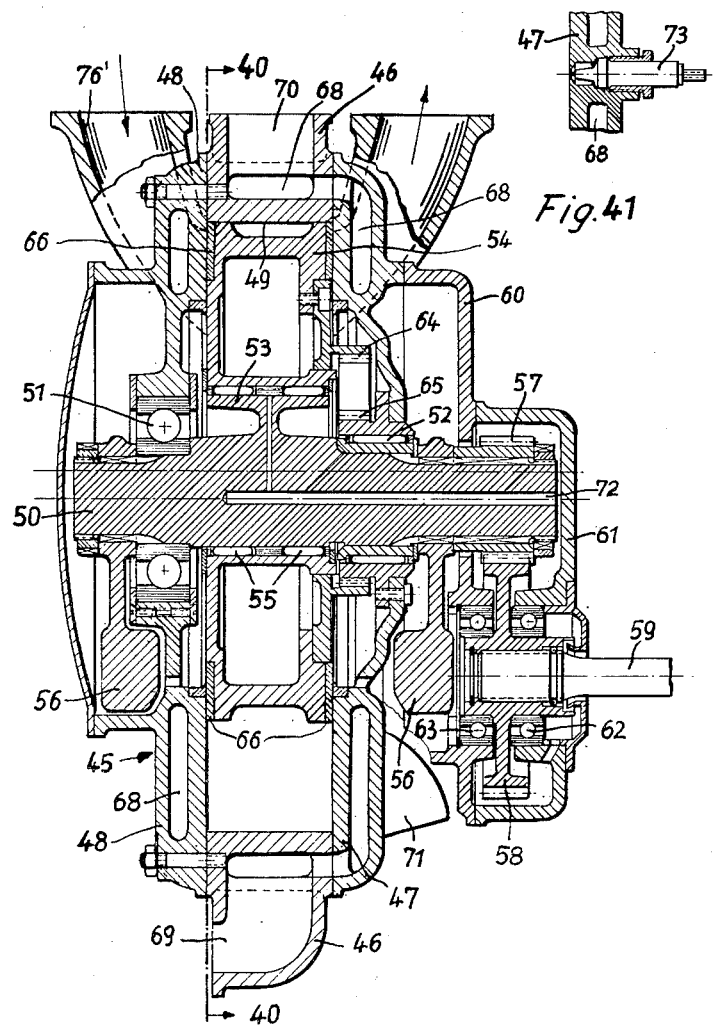

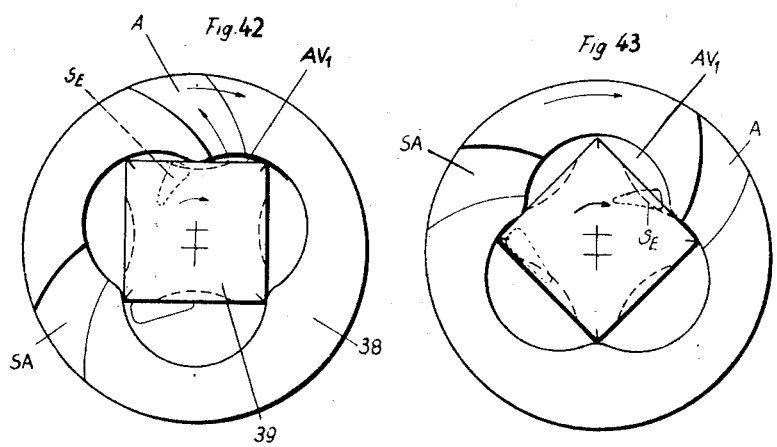
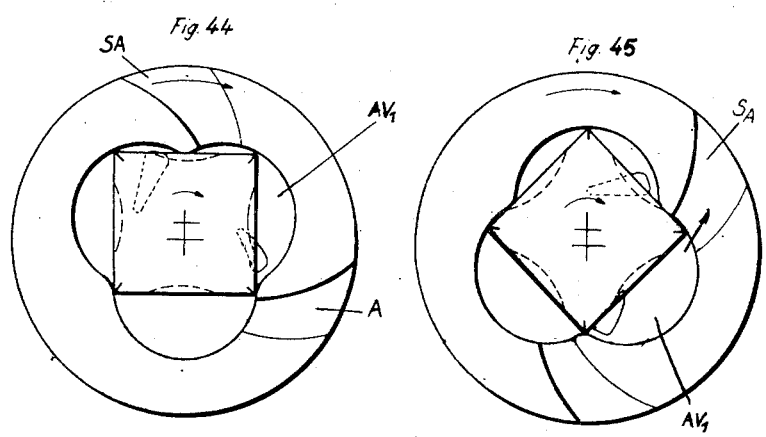

$\frac{a}{b} = 1.189$ $\frac{a}{b} = 1.358$ $\frac{a}{b} = 1.813$

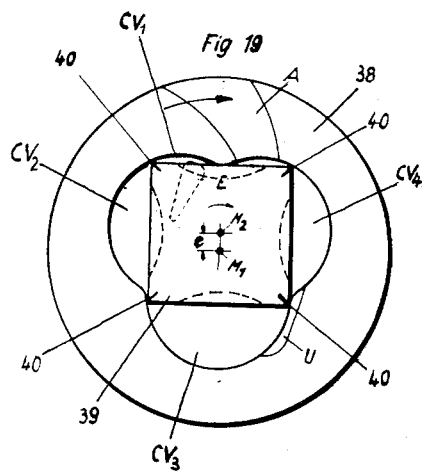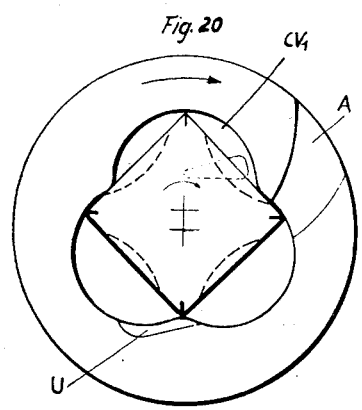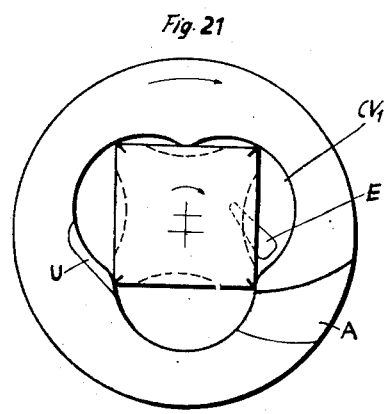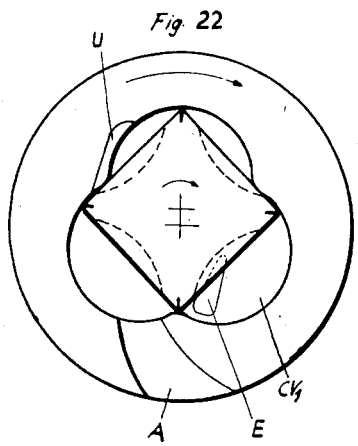

June 13, 1961  F. WANKEL ET AL  2,988,065
ROTARY INTERNAL COMBUSTION ENGINE
Filed Nov. 17, 1958  21 Sheets-Sheet 19
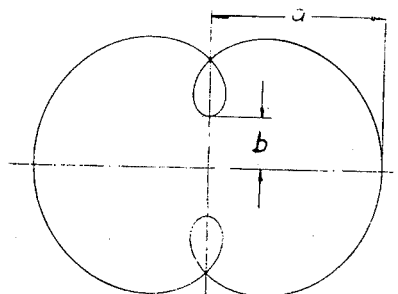
Fig. 50  $\frac{a}{b} = 3.5$
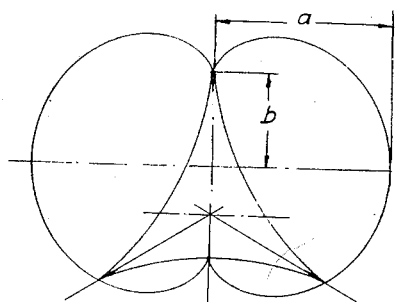
Fig. 51  $\frac{a}{b} = 2$
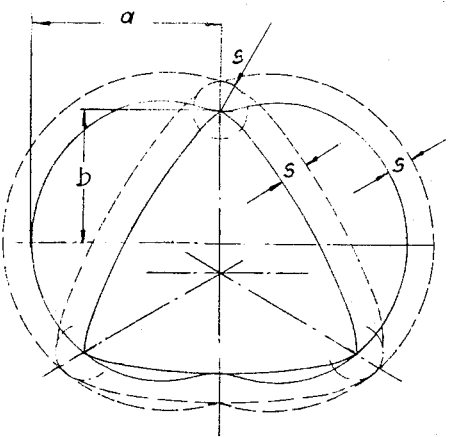
Fig. 52  $\frac{a}{b} = 1.5$
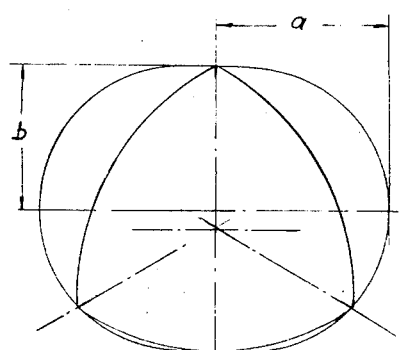
Fig. 53  $\frac{a}{b} = 1.25$
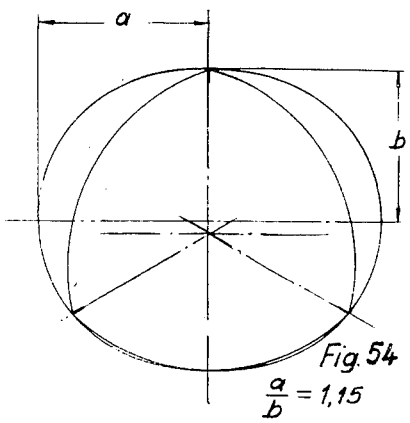
Fig. 54  $\frac{a}{b} = 1.15$
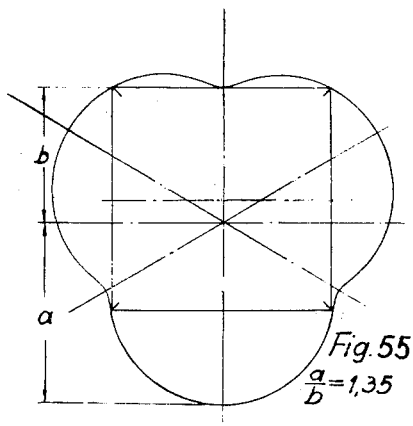
Fig. 55  $\frac{a}{b} = 1.35$

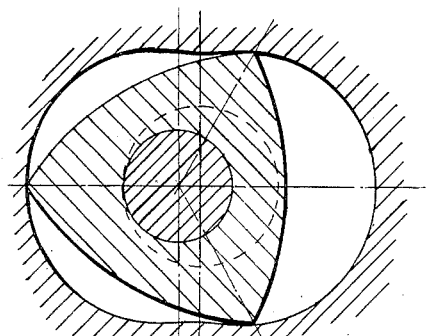
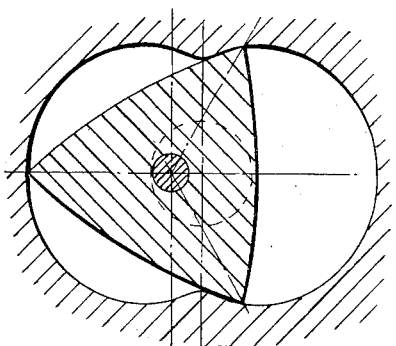
Fig. 62  $a/b = 1.35$     Fig. 64  $a/b = 1.55$
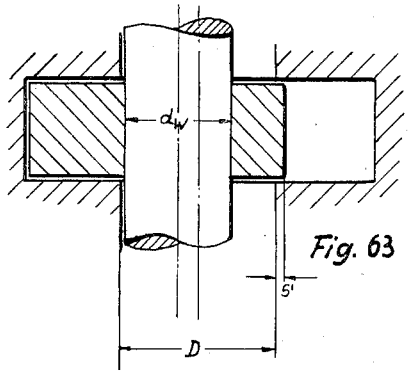
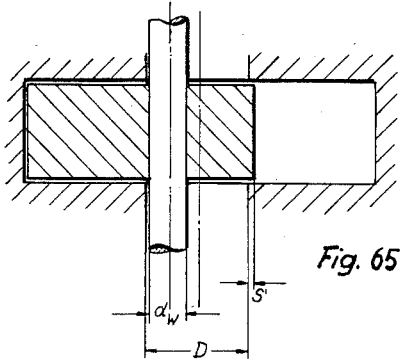
Fig. 63     Fig. 65
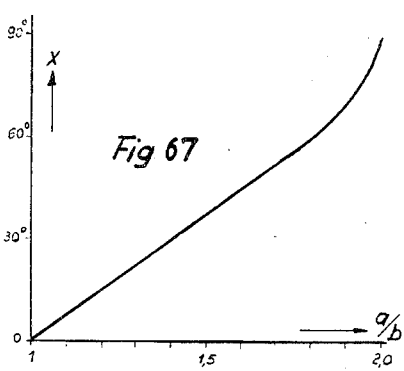
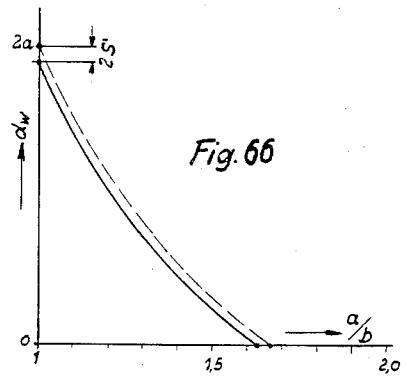
Fig 67     Fig. 66

$\varepsilon = \dfrac{V_{max}}{V_{min}}$ $\varepsilon = \dfrac{V_{max} + V_{min}}{2\,V_{min}}$

United States Patent Office 2,988,065
Patented June 13, 1961

2,988,065
ROTARY INTERNAL COMBUSTION ENGINE
Felix Wankel and Ernst Hoeppner, Lindau (Bodensee), Germany, assignors to NSU Motorenwerke Aktiengesellschaft, Neckarsulm, Germany, and Wankel G.m.b.H., Lindau (Bodensee), Germany
Filed Nov. 17, 1958, Ser. No. 774,517
Claims priority, application Austria Mar. 11, 1958
38 Claims. (Cl. 123—8)

This invention relates broadly to the art of rotary mechanisms.

More particularly, this invention relates to the art of internal combustion engines of the rotary type, and this application is a continuation in part of our prior application Ser. No. 646,752, filed on March 18, 1957, and entitled Rotary Piston Four-Stroke Cycle Internal Combustion Engine, and now abandoned.

This invention is particularly related to a rotary internal combustion engine of the type including an outer component having axially spaced end walls and a peripheral wall parallel to the axis of the engine that defines an internal chamber and an inner component having axially spaced end surfaces and a peripheral wall mounted within the chamber, with the facing peripheral surfaces of the inner and outer components being shaped to define upon suitable relative rotation a plurality of variable volume chambers within the outer component.

This invention has for a particular object to provide an improved rotary internal combustion engine of the type in which the co-operating shapes of the internal periphery of the outer component and the outer periphery of the inner component are constructed to provide for maximum utilization of the internal volume of the outer component.

Accordingly, the present invention has for a particular object to provide a rotary internal combustion engine in which the inner component or body is supported within the outer component or body for relative rotation with respect thereto about an axis eccentric of and parallel to the axis of the outer component, the inner surfaces of the outer body including a plurality of arched lobe-defining portions symmetrically spaced circumferentially about the axis of the outer body, and the outer or peripheral surface of the inner body being continuous and including a plurality of apex portions symmetrically spaced circumferentially about its axis with each apex portion incorporating an edge surface parallel to the axis of the inner body for engagement with the inner surface of the outer body, the lobe-defining portions being one less in number than the number of apex portions, one of the bodies having only one effective intake passage means therein communicating with the space between the exterior of the inner body and the interior of the outer body for alternately feeding all the variable volume chambers that are defined during relative rotation of the bodies, there being means provided for feeding a mixture of air and fuel to said passage means, and the outer body having an outlet port means communicating with the space between the bodies, whereby, when the bodies relatively move in a manner determined by the number of apex portions relative to the number of lobe-defining portions, the occurrence of the events making up the cycle of operation of the engine is effected solely by the relative movement of the inner body with respect to the outer body.

Consistent with the foregoing object it is an additional object to provide in such an engine, means for permanently maintaining said relative movement of the bodies.

It is a particular object of this invention to provide the arched lobe-defining surface portions of the outer body in the form of either a 2-lobed or 3-lobed epitrochoid of the type traced by a point on the diameter of a circle rolling on the outside of a fixed circle lying within the rolling circle and with the inner body having a shape approximating the inner envelope of the projections of said epitrochoid on a transverse plane integral with said inner body in all the successive positions of the two bodies as they undergo relative movement as determined by the eccentricity of their axes and the ratio of the number of said lobes to the number of said apex portions. For brevity, said inner envelope is hereinafter referred to as the inner envelope of said epitrochoid. It is obvious that this inner envelope is the maximum permissible outline of the inner body, beyond which interference between the inner body and the peripheral wall of the epitrochoidal cavity will occur. As noted above, said inner envelope in the case of the two-lobed epitrochoid will have three apex portions and in the case of the three-lobed epitrochoid will have four apex portions.

Consistent with the immediately foregoing object the invention provides a rotary engine in which both bodies can rotate in the same direction with the outer body rotating at the higher speed, or a rotary engine constituting the kinematic inversion whereby the outer body is stationary and the inner body performs a planetry rotary movement relative to the outer body.

It is a further particular object of the invention to provide a channel in the outer surface of the inner body between each two adjacent apex portions. These channels provide for the passage of gas from the space bounded by one lobe-defining portion of the outer body to the space bounded by the next adjacent lobe-defining portion of the outer body in the direction of relative movement of the inner body and in the relative position of both bodies that defines the minimum volume of a working chamber.

In addition the channels function to reduce the compression ratio of the engine to effective limits. Furthermore the channels can be utilized to accommodate spark plugs.

It is a further object of the invention to provide an improved relationship of ignition means of the spark plug type. In connection with the ignition means the invention contemplates several alternative arrangements, such as mounting a plurality of spark plugs corresponding in number to the number of apex portions on the inner body with the plugs extending radially of the axis of the inner body, or the mounting of a single spark plug on the outer body. In connection with the utilization of a single spark plug carried by the outer body two hereinafter described favorable locations are pointed out.

It is a still further object of this invention to provide a rotary internal combustion engine in which the inner periphery of the outer body or component has the shape of a 3-lobed epitrochoid, the inner body or component is shaped to approximate the inner envelope of such epitrochoid and accordingly has four apex portions symmetrically spaced about its axis and in which a recess is provided on the inner peripheral surface of the outer body between and interconnecting two adjacent lobes, so that upon movement of successive apex portions across the inner periphery of the outer body, this recess during certain phase positions of the bodies, provides for overflow from one volume chamber to another during the expansion cycle of the first chamber at the phase position of the bodies where the volume of the preceding chamber is at its minimum.

A still further object is to provide in a rotary engine of the form in which the outer body has the shape of a 3-lobed epitrochoid, an improved porting arrangement constructed and arranged to provide for drawing in cooling air and discharging the same during successive phase positions of the bodies so as to constitute a 6-cycle operation.

It is a further object of this invention to provide the outer body with an epitrochoidal shape restricted to a narrow range of the ratio between the maximum distance from the geometrical center of the outer body to the inner periphery thereof compared with the minimum distance from such center to the inner periphery, whereby an efficient internal combustion engine is obtained having minimum size and weight characteristics per horse power output, one that ensures maximum utilization of intake passage effective area with regard to the space available within the outer body, and which range of ratios further ensures effective and efficient provision for other factors contributing to operating efficiency such as displacement volume, compression ratio, shaft size or diameter, effectiveness of sealing elements and frictional wear factors. This range of ratios will be hereinafter referred to as the $a/b$ quotient wherein $a$ designates the maximum distance from the center to the periphery, and $b$ designates the minimum distance from the center to the periphery.

Further and more specific objects of the invention will be apparent from the following description taken in connection with the accompanying drawings in which:

FIGURE 1 is a view partly in longitudinal section and partly in elevation through the axis of one form of rotary internal combustion engine in which the inner periphery of the outer rotor has the shape of a 2-lobed epitrochoid and the inner rotor is shaped as the approximate inner envelope thereof and has three apex portions, FIGURE 2 is a cross sectional view taken along line 2—2 of FIGURE 1, FIGURE 2a is a fragmentary cross sectional view in line 2a—2a of FIGURE 2 and illustrates a detail of the invention.

Figure 15:
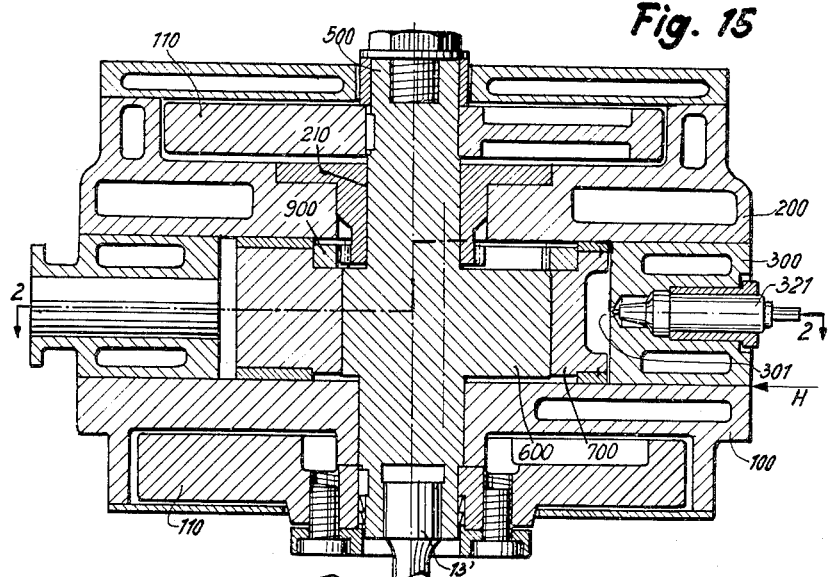
Figure 16:
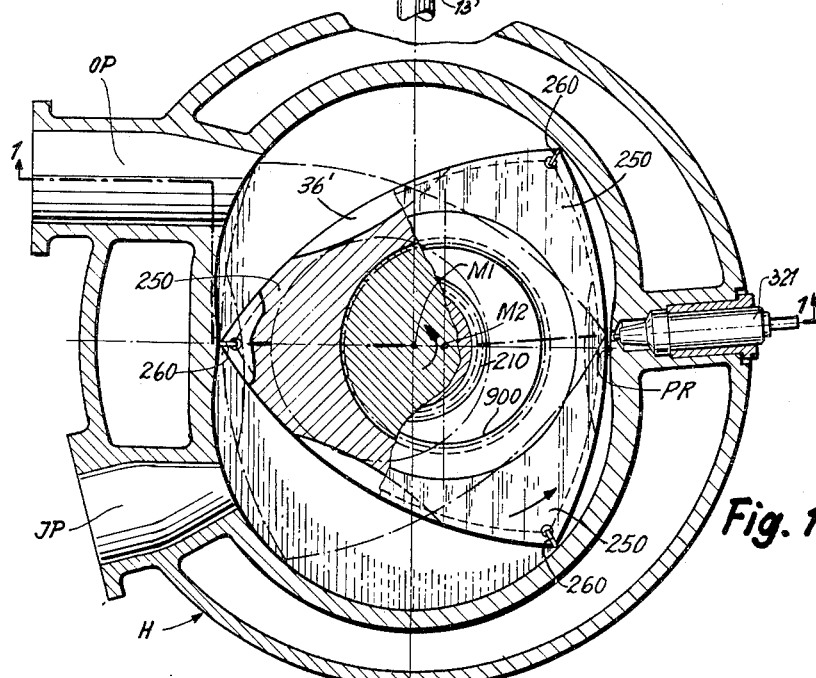
Figure 17:
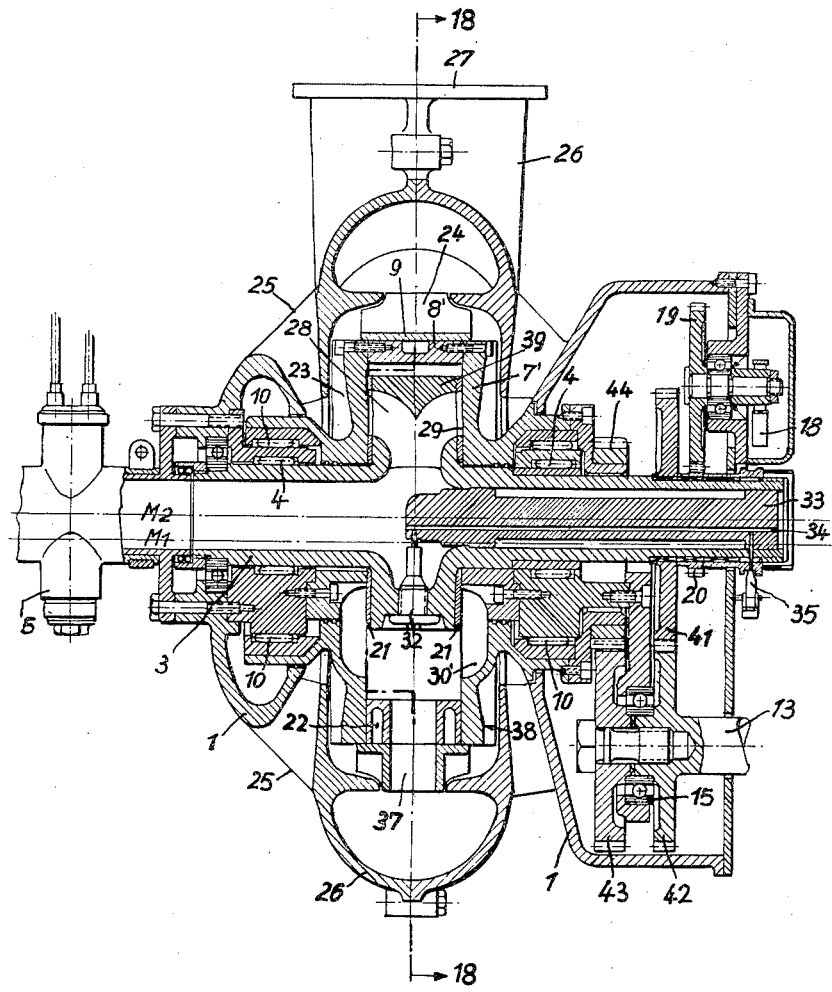
Figure 18:
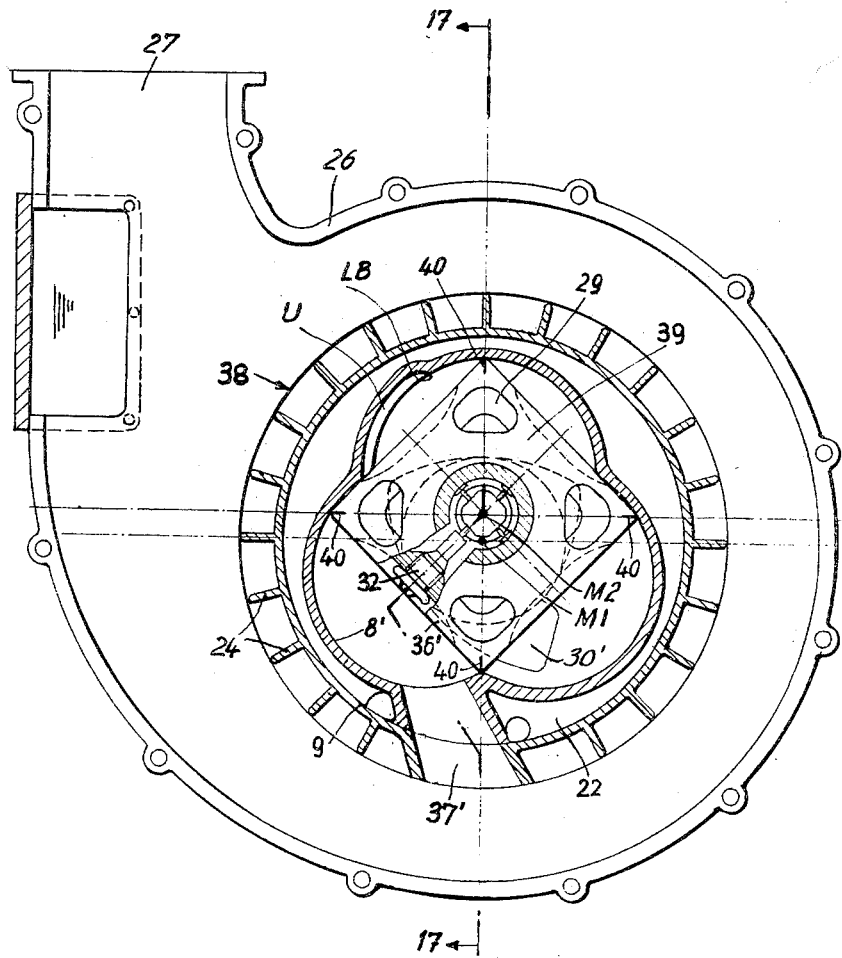
Figure 23:
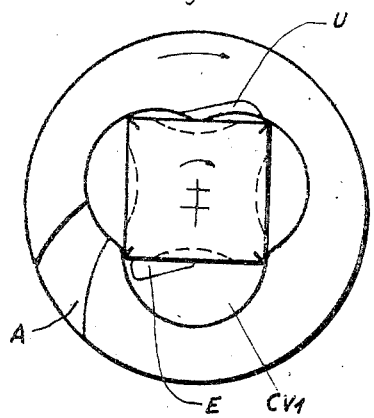
Figure 40:
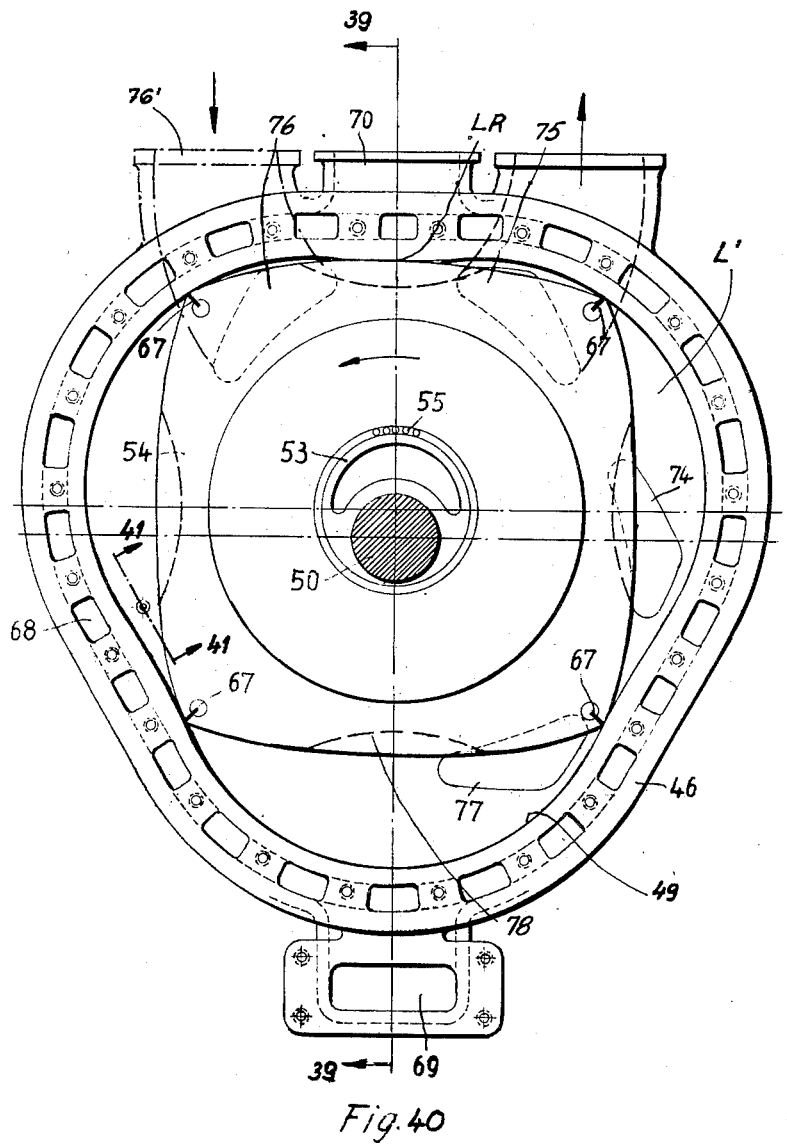

FIGURES 3 to 14 inclusive are diagrammatic sectional views illustrating the phase relationship of the rotors during operation of the engine shown in FIGURE 1, FIGURES 15 and 16 are views similar to FIGURES 1 and 2 but illustrating a modified form of engine in which the outer component is stationary and in which the inner periphery of the outer component has the shape of a 2-lobed epitrochoid, FIGURES 17 and 18 are views similar to FIGURES 1 and 2 in which the inner periphery of the outer rotor has the shape of a 3-lobed epitrochoid while the inner rotor is the approximate inner envelope thereof and has four apex portions, FIGURE 17 being a longitudinal sectional view taken along line 17—17 of FIGURE 18, while FIGURE 18 is a sectional view taken along line 18—18 of FIGURE 17, FIGURES 19 to 38 are views similar to FIGURES 3 to 14 and illustrate diagrammatically the phase relationship of the components of the engine shown in FIGURES 17 and 18, FIGURE 39 is a longitudinal sectional view taken along line 39—39 of FIGURE 40, and illustrating a modified form of engine of the type shown in FIGURES 17 and 18 in which the outer component of the engine is stationary and its inner periphery is in the form of a 3-lobed epitrochoid while the inner component is a rotor, FIGURE 40 is a view partly in cross section and partly in end elevation taken along line 40—40 of FIGURE 39, with one end wall of the stationary component or housing removed, FIGURE 41 is a fragmentary sectional view on line 41—41 of FIGURE 40 and illustrating the spark plug and its mounting in the stationary outer component, FIGURES 42 to 49 are diagrammatic views similar to FIGURES 19 to 38, but illustrating a modified working cycle for an engine as shown in FIGURES 39 and 40 which includes additional strokes for sucking in and discharging cooling air, FIGURES 50 to 55 are diagrammatic views illustrating various shapes of trochoidal bodies, and the inner envelopes thereof, with reference to the ratio between the maximum distance from the center of the outer body or component to the furthermost point on the epitrochoidal curve from its center, in relation to the minimum distance from the same center to the closest point on the curve.

Figure 56:
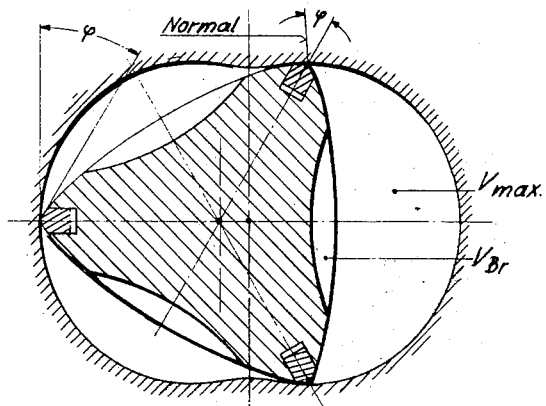
Figure 57:
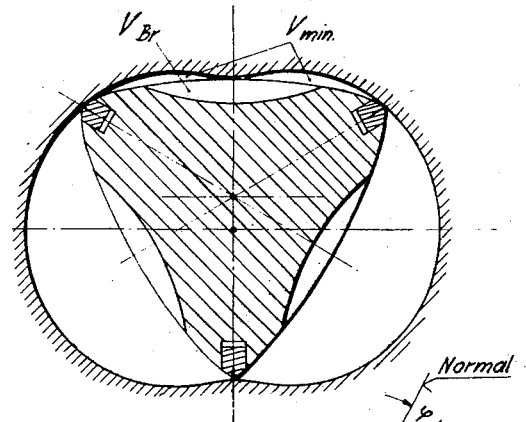
Figure 58:
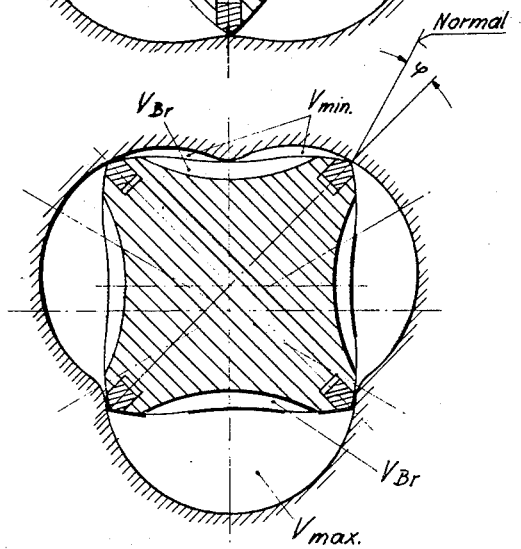

FIGURES 56 to 58 are diagrammatic views illustrating the relationship between the maximum volume of the combustion or working chamber and the minimum volume thereof, with FIGURES 56 and 57 being applicable to the form of engine shown in FIGURES 1 and 2, whereas FIGURE 58 is applicable to the engine shown in FIGURES 15 and 16, FIGURES 59 to 61 are diagrammatic views illustrating the relationship between the specific shape of the components of the engine and the effective size of the intake passage means which latter are located in one or both of the end walls that bound the internal volume of the engine, FIGURES 62 to 65 are diagrammatic views illustrating the relationship between the shapes of the inner and outer components of the engine and the size or diameter of the shaft carrying the inner component, FIGURE 66 is a diagram illustrating the relationship between shaft diameter and the shape of the outer component of the engine, FIGURE 67 is a diagram illustrating the relationship between the specific shape of the outer component and the maximum angle between the line perpendicular to the trochoid and the bisector of the contacting apex of the inner component, and FIGURES 68 to 75 are diagrams illustrating different factors governing the construction of a practical and effective engine, with respect to the criticality of the shape of the outer component.

The invention will now be described with reference to the drawings with the understanding that where sealing elements are carried by the inner component they are of the type contemplated by prior filed applications Ser. No. 654,840, filed on April 24, 1957, in the name of Felix Wankel, and entitled Improvements Relating to Seals for Working Spaces of Rotary Piston Machines, now U.S. Patent No. 2,880,045; and application Ser. No. 761,339, filed September 16, 1958, in the names of Felix Wankel, E. Höppner and Walter Froede, and entitled Rotary Mechanism.

In the rotary engine shown in FIGURE 1 there is included a housing 1 that is stationary and which is supported by any suitable means not shown. Within the housing is a stationary insert component on each side of the median transverse plane through the engine, such components being designated by the reference character 1e. Roller bearings associated with these components 1e carry a shaft 3 that carries an inner rotor 2. This shaft 3 is hollow and is connected in communication with a suitable carburetor 5 from which the fuel-air mixture is fed to the engine as hereinafter described. The inner rotor 2 is mounted by bearings 4 to rotate about an axis $M_2$, this axis being parallel to the axis $M_1$ of the outer component 6 of the engine. In this form this outer component 6 is a rotor and includes axially spaced end walls 7 interconnected by a peripheral wall 8 having a cooling medium accommodating channel 22 therein that is surrounded and closed by an outer ring shaped structure 9. This structure further has fins 24 for dissipating heat and simultaneously functioning as fan blades that circulate air through openings 25 provided in opposite faces of the housing walls 26. Additional blades 23 are provided on the outer surfaces of the end walls 7 of the outer rotor, but the details of the cooling relationship form no part of this invention. The outer rotor 6 is provided with two oppositely extending hub portions 7a that are mounted on bearings 10 carried by the insert components 1e of the stationary housing construction. Since the outer rotor 6 has its axis eccentric to the axis of the inner rotor the two insert components 1a have what can be termed filler pieces 1f fixed thereto to fill the space between the inner periphery of the outer rotor and the outer periphery of hollow shaft 3 in that area below the position where the inner periphery of the outer rotor makes tangential contact with hollow shaft 3. The inner surface of the shell or wall 8 in this form of the invention is shaped as a 2-lobed epitrochoid or of an outer curve parallel to such epitrochoid, see FIGURE 2. The external shape of the inner rotor 2 corresponds approximately to the inner envelope of such epitrochoid. Consequently the shape relationship of the two rotors provide facing surfaces that define upon relative movement of the two rotors a plurality of variable volume working chambers. The inner rotor is what can be termed a timing element and has three apex portions and sealing means diagrammatically denoted at 11 are mounted in grooves extending along the apex portions parallel to the axis of this rotor. Thus the edges of the apex portions make continuous contact with the inner periphery of the outer rotor. The end face sealing elements 21 are mounted on the inner rotor to seal against the inner faces of the end walls 7 so that during rotation the working chambers are properly sealed from one another. Since the arched lobe-defining portions of the inner surface of the outer rotor are one less in number than the number of apex portions on the inner rotor the rotors rotate in the same direction with the outer rotor rotating at a faster speed, the speed ratio being determined by the number of apex portions relative to the number of lobe-defining portions. As will be clear from the description of the working cycle of the engine the pressure built up between the outer rotor and the inner rotor acts radially on the inner rotor while the pressure on the outer rotor will have a vector eccentric to the axis $M_1$ thus effecting the rotation of the outer body and, through the reaction of its inner periphery at the points of contact with the inner body, the roation of the latter. The respecive bodies rotate in the same direction at the ratio of 3:2.

A gear wheel 12 is keyed on the hollow shaft 3 and is in mesh with the gear 14 keyed to an output shaft 13. The output shaft is supported within one end of the stationary housing by ball bearing means 15, suitably supported in a housing component. Another gear wheel 16 is fixed to the output shaft and meshes with an external gear 17 carried by an extension of the outer rotor. The transmission between shaft 3 and the outer rotor 6 through said gears 12, 14, 17 is so selected that the gears have a ratio of 3:2 so as to permanently maintain the rotors turning in the same direction at that fixed speed ratio. The periphery of the inner rotor 2 is provided with a channel or trough 36 between each two adjacent apex portions. As shown the channel has a substantial extent in the direction between these two apex portions and as will be mentioned hereinafter has a depth at least at the median distance between the two apex portions sufficient to ensure passage of gas from the space bounded by one lobe-defining portion of the outer body to the space bounded by the next adjacent lobe-defining portion in the direction of relative movement of the inner rotor and in the relative position of both rotors that defines the minimum volume of a working chamber, as shown in FIGS. 3 and 8.

In this form of the invention a spark plug 32 is mounted in each channel, only one plug being shown in the drawings. The spark plugs extend radially of the axis of the inner rotor 2 and the electrodes are arranged such that the danger of their being fouled is at a minimum. An insulating member 33 is mounted in one end of the hollow shaft 3 and accommodates high tension wire or cable means 34 to provide current to the spark plugs, the current being applied to the cable 34 by means denoted at 35. The ignition timer 18 is driven by shaft 3 by means of intermeshing gears 20 and 19.

In order to feed the fuel-air mixture to the engine and to control the working cycle of the engine solely by the movement of the inner rotor relative to the outer rotor at least one of the end walls 7 is provided with a transfer channel means in the form of a recess 30. FIGURE 2a illustrates a longitudinal section taken through the radius of the wall 7 in that location in which the recess 30 reaches its maximum radial extent. Preferably there are similarly arranged mirror imaged recesses 30 in both end walls. The inner rotor 2 is provided with a plurality of internal ducts 28, in this embodiment three spaced respectively 120° apart. Each duct terminates in an opening 29 in the end face seal means so as to, upon relative movement of the rotor, feed the mixture into the recess 30 so it can enter a working chamber. In this present embodiment each end wall 7 of the outer rotor 6 is provided with a similarly shaped recess 30 and the duct means 28 in the inner rotor 2 are bifurcated and open in opposite directions. In any event, the duct means 28 and the recess means 30 constitute only one effective intake passage means communicating with the space between the exterior of the inner body or rotor and the interior of the outer body or rotor for alternately feeding all working chambers as the rotors relatively move. In addition an outlet port 37 is arranged in communication with the inner periphery of the outer rotor. After the engine is started by suitable starter means, not shown, the mixture of fuel and air is sucked through carburetor 5 and flows through the interior of hollow shaft 3 through ducts 28 to the openings 29 which are in the end face sealing elements 21 and then into the transfer channels or recesses 30, and from there into a working chamber such as $V_1$, FIGURE 2.

During relative rotation between the rotors, working chambers designated at $V_1$, $V_2$ and $V_3$ are formed between the outer surface of the inner rotor and the inner surface of the outer rotor. FIGURE 2 illustrates a phase position in which working chamber $V_1$ is being fed with fuel through the recess means 30, working chamber $V_2$ is exhausting and working chamber $V_3$ is undergoing compression.

FIGURES 3 to 14 diagrammatically illustrate sufficient phase positions from which the working cycle of the engine, which is a 4-cycle operation, can be followed. Each chamber during the relative rotation goes through a 4-cycle operation wherein fuel-air mixture is fed thereto and its volume increases until adjacent apex means and the relative movement of the rotors provide a chamber of maximum intake volume, following which said chamber undergoes compression until the chamber reaches a position (such as that of chamber $V_3$ in FIGURE 8), which is almost at minimum volume and maximum compression and is just in advance of what would be top dead center in a reciprocating engine. At this position ignition occurs, the channel or trough 36 permitting free flow of compressed gas from one lobe-defining portion adjacent apex $2b$ to the following lobe-defining portion adjacent apex $2a$ as regards the direction of rotation of the outer rotor. Passing from the position of FIGURE 8 to the position of FIGURE 9 it is evident that the portion of chamber $V_3$ adjacent apex $2b$ is being reduced in volume whereas the portion adjacent apex $2a$ is increasing in volume and channel 36 must be adequate in size to permit free flow of gas from one portion to the other past the inner surface part of the outer rotor that is at minimum distance from the geometrical center of the outer rotor. The volume of each channel 36, as explained hereafter, provides an adjustment of the compression ratio for the engine. With ignition occurring, the rotors move on to the position of FIGURE 9 where pressure in chamber $V_3$ will build up between the outer rotor 6 and the inner rotor 2. The pressure acting against inner rotor 2 is always radial, but the pressure in the same chamber acting on rotor 6 will have a vector eccentric to axis $M_1$ causing rotation of the outer rotor clockwise until it passes beyond the position of FIGURE 14 where chamber $V_2$ is completing exhaust with gas escaping to the atmosphere on to the position of FIGURE 3. The diagrammatic representations of FIGURES 3 to 14 illustrate consecutive phases of operation of an engine having a rotor speed ratio of 3:2 and show the change in the volume of the working chambers. Both rotors revolve clockwise and each illustrated consecutive phase representing the position after rotation through a further angle of 33.75° of the outer rotor, and of 22.5° of the inner rotor. The transfer channel means 30 in the outer rotor and the position of the exhaust or outlet port 37 in the outer rotor are clearly shown in each figure so that the manner of operation is readily understood. Since thirty-two diagrammatic views would be necessary to follow the individual movements of the rotors in illustrating a complete working cycle for any working chamber the phases have been presented in such a sequence that working chamber $V_1$ in undergoing a complete working cycle first passes through the consecutive positions shown in FIGURES 3 to 14. The immediately subsequent consecutive phase positions of working chamber $V_1$ are identical with those shown for working chamber $V_3$ in the same figures (FIGS. 3 to 14). Similarly, the next succeeding consecutive phase positions of working chamber $V_1$ are identical with those shown in the same figures for working chamber $V_2$.

In FIGURE 3 the rotors are in a position in which the intake or induction phase for chamber $V_1$ is commencing. Following the views consecutively it is apparent that the volume of chamber $V_1$ is increasing until a maximum volume is obtained at the phase position shown in FIGURE 11. In FIGURE 13 the compression starts in chamber $V_1$ and continues as shown in FIGURE 14. Returning to FIGURE 3 and using the chamber designated $V_3$ to show the subsequent phase positions of chamber $V_1$ and again following the figures consecutively it will be seen that compression continues through FIGURES 4 to 8 wherein the chamber has approximately its minimum volume and maximum compression at which point ignition occurs. Following ignition the pressure builds up between the outer rotor and the inner rotor and the chamber begins to expand. As explained previously, the pressure acting on the inner rotor is always radial but the pressure existing in the illustrated chamber $V_3$ has a vector eccentric to axis $M_1$ tending to turn the outer rotor clockwise. The expansion or working stroke continues through the positions illustrated in FIGURES 9 to 14 and also through the illustrated positions of chamber $V_2$ which, starting from FIGURE 3 consecutively illustrate the end of the working stroke in FIGURES 3 and 4 and the commencement of the exhaust stroke in FIGURE 5. The completion of the exhaust stroke is shown by the phase positions of chamber $V_2$ in FIGURES 5 to 14. Since there are three spark plugs, each chamber will be fired in succession as it reaches the relative position shown in FIGURE 8 for chamber $V_3$.

As shown in the drawings the exhaust port 37 has its trailing end displaced rearwards with respect to the direction of rotation from its inlet end so as to facilitate the exhaust of the gases from the working chambers. In addition, in embodiments of the invention where the ignition means of the spark plug type are mounted on the inner rotor, the plugs can be changed or serviced when necessary by providing an access opening AO in the portion 26 of the housing 1, FIGURE 2, and manually turning the rotors to the position corresponding to FIGURE 12 in which a suitable tool can be inserted through such access opening and through the exhaust or outlet port 37 for co-operation with the end of the plug to remove the same.

It is clear, therefore, that the control of the inflow and outflow of the fuel-air mixture and exhaust gases respectively, is effected solely by the relative movement of the two rotors 6 and 2. Therefore this invention eliminates the necessity for valves or any other flow control means, the exposing and closing of the transfer channel means 30 and the exhaust gas outlet port 37 being effected by the co-operation of the end faces of the inner rotor and the edges of the apex portions, respectively.

As indicated previously the invention contemplates the kinematic inversion of the structure of FIGS. 1 and 2. FIGURES 15 and 16 illustrate such arrangement in which the outer component of the engine is a stationary housing H. Suitable supporting means, not shown, are provided for mounting of the housing in the desired position. The housing includes two axially spaced end walls 100 and 200. These end walls are interconnected by a peripheral wall or shell 300 the inner contour of which is in the form of a 2-lobed epitrochoid or of an outer curve parallel thereto. The axis of the outer component is again illustrated at $M_1$. The plate or wall means 200 are provided with an aperture within which is fixed a combined bearing and externally toothed gear 210. The other end wall 100 is provided with a journalling aperture of the same diameter as that of the inner diameter of the component 210. Within these apertures is journalled a shaft 500 which carries an eccentric 600. Mounted to turn on this eccentric is the inner rotor 700. To counter-balance the eccentric and inner rotor suitable counter-weights 110 are keyed to opposite end portions of shaft 500. An output shaft 13' is splined within a socket on one end of shaft 500. In this form of the invention the peripheral shell or wall structure 300 has a stepped bore therethrough terminating in a circular aperture 301. A spark plug is mounted within this bore with its electrode disposed within the central aperture with a restricted but sufficient clearance space to provide an effective spark gap between the electrode and the metal of the casing. The shell 300 is also provided with an inlet port IP and an outlet port OP. In this form of the invention, as in the case of the arrangement of FIGURES 1 and 2, only one effective intake passage means is provided for alternately feeding all of the working chambers between the facing surfaces of the inner rotor and housing, respectively. The inner rotor 700 performs a planetary rotary movement in a counter-clockwise direction (as viewed in FIG. 16) with regard to the casing. Since the internal contour of the casing is a 2-lobed epitrochoid the rotor is of generally triangular configuration and has three apex portions 250 at which are mounted edge seal means 260 of the type disclosed in prior application Ser. No. 761,339. Suitable end face seal means as in said application are also carried by the rotor. The edge seal means 260 being mounted in slots that extend inwardly of the theoretical apices of the rotor, and these seals make continuous sliding contact with the inner periphery of the housing during the planetary movement of rotor 700. The rotor carries an internally toothed gear 900 that is in mesh with the teeth of the combined bearing and gear member 210, the ratio of the intermeshing teeth being 3:2 so that for every revolution of the rotor about its own axis the shaft 500, and hence the output shaft, rotates three times in the same direction.

The outer surfaces of the rotor 700 are provided with channels 36' which function to permit passage of the gas from one lobe-defining portion to the other when the rotor is in the firing position as shown in FIG. 16. As mentioned previously the size of these channels also functions to provide an effective suitable compression ratio for the engine.

As indicated in FIGURE 16 the circular aperture accommodating the electrode of the spark plug 321 is located in the peripheral wall of the shell or housing at a position spaced circumferentially of and near one of the points on the inner wall surface of the housing of least radius from its center. Further this aperture is located in the peripheral surface of the outer body at a distance beyond said point of least radius PR such that when one apex portion is passing the aperture the preceding apex portion has exposed part of the outlet port OP. With this arrangement the pressures in the two chambers on opposite sides of the aperture are substantially equal so that when the edge seal means passes the aperture and momentarily permits a connection between the two chambers as shown in dot-and-dash lines in FIGURE 16, there is no danger of a blow-back.

The operating cycle of the engine of FIGURES 15 and 16 is the same as described with reference to embodiment of FIGURES 1 and 2 and is a 4-cycle operation.

The invention further contemplates a structural arrangement in which the outer and inner components are respectively shaped so that the inner periphery of the outer component has the shape of a 3-lobed epitrochoid or of an outer curve parallel thereto while the rotor within this outer component is a generally square body or timing element having four apex portions. FIGURES 17 and 18 are similar to FIGURES 1 and 2 and illustrate this form of the invention. Since the only difference in the structure is in the shape of the rotors those component parts that are identical with the arrangement of FIGURES 1 and 2 bear the same reference characters. FIGURE 17 is a true section through the inner rotor, but for purposes of clarity the outer rotor is sectioned at an angularly displaced position relative to its position in FIGURE 18. Thus the outer rotor 38 has its inner wall surface 8' shaped to provide three lobe-defining portions while the rotor 39 has four apex portions. Suitable seal means are provided at the apex portions as diagrammatically indicated at 40 and these seal means make continuous sealing contact with the inner periphery of the outer rotor. During relative rotation of the rotors, four variable volume working chambers are defined between the outer surface of rotor 39 and the inner surface of rotor 38. The rotors rotate in the same direction at a fixed speed ratio determined by the number of apex portions relative to the number of lobe-defining portions, and in this case at a speed ratio of 4:3 with the outer rotor moving at the higher speed. A gear 41 carried by shaft 3 is in mesh with gear 42 carried by the output shaft 13. A gear 43 also fixed to the output shaft meshes with gear 44 carried by the outer rotor so as to permanently maintain the speed ratio. Only one effective intake passage means is provided in the outer rotor and this passage means includes oppositely facing similarly shaped transfer channels or recesses 30' provided in the facing surfaces of end walls 7'. Fuel-air mixture is fed into the space between the rotors through the outer shaft 3 and the ducts 28, 29 as in the case shown in FIGURE 1. A spark plug 32 is mounted in each of the channels 36' that are provided on the side surfaces of the inner rotor 39 and an exhaust gas outlet port is shown at 37'. In this form of the invention the inner surface of the outer rotor is provided with a recess U which extends a substantial distance in one lobe-defining portion LB and past the next adjacent point of least radius so as to provide for overflow from one chamber to the next chamber during operation, as will be explained.

FIGURES 19 to 38 illustrate diagrammatically the working cycle of the engine having a configuration similar to that shown in FIGURES 17 and 18. The inner periphery of the outer rotor 38 is in the form of a 3-lobed epitrochoid while the inner rotor for the sake of simplicity is shown in the form of a square and has four sealing edges 40, making continuous sliding contact with the inner surface of the outer rotor. The axis of the outer rotor is designated at $M_1$ and that of the inner rotor at $M_2$. The distance between these two axes is shown at $e$. Both rotors rotate clockwise and the speed ratio is 4:3 with the outer rotor turning at the higher speed. In these diagrammatic figures the angular distance between the individual figures, i.e. the relative phase positions, is 60° as regards the outer rotor, and 45° as regards the inner rotor.

The working cycle of the engine having the 2-lobed epitrochoid as pointed out previously is a 4-stroke cycle effected in each of three working chambers. In the engine shown in FIGURES 17 and 18 the cycle is in effect a 6-stroke cycle and occurs in each of four working chambers. In addition to the usual four strokes two additional strokes are effected. In the cycle shown in FIGURES 19 to 38 the engine operates with prolonged expansion. In these figures the exhaust passage or port is shown at A and the inlet port is shown at E, the transfer channel between two adjacent lobe-defining portions is shown at U and the four working chambers are designated $CV_1$, $CV_2$, $CV_3$ and $CV_4$. In these figures the operation of working chamber $CV_1$ is illustrated in the different phase positions.

Figure 24:
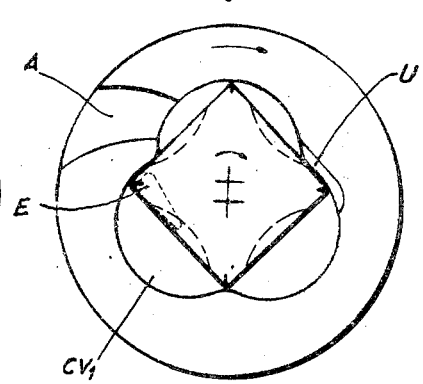
Figure 25:
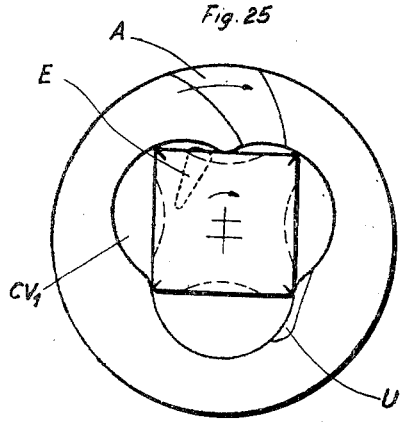
Figure 26:
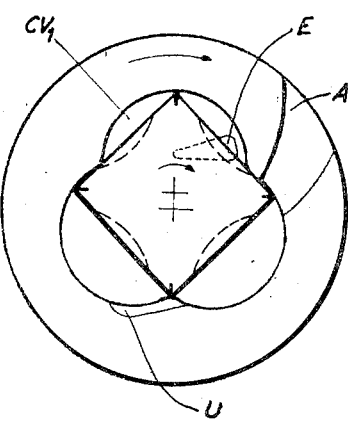
Figure 46:
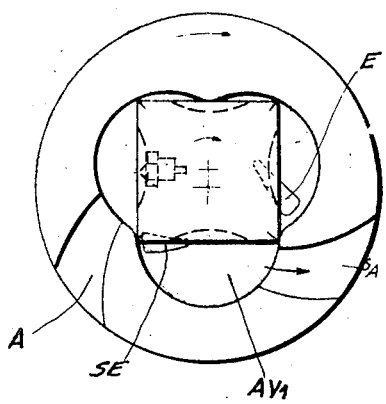
Figure 47:
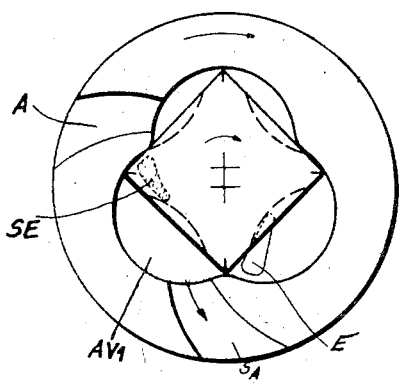
Figure 48:
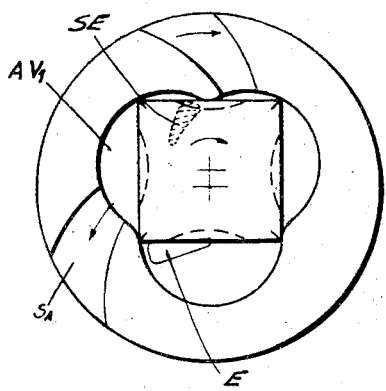
Figure 49:
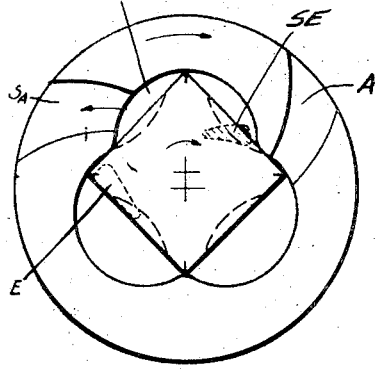

In FIGURE 19 the rotors are in the position in which chamber $CV_1$ has its minimum volume and thus the position that would correspond to top dead center in a reciprocating engine in which both the inlet and exhaust passages are in communication with this chamber. Upon further clockwise rotation the internal volume of chamber $CV_1$ increases while the inlet port E is progressively opened wide so that the fuel-air mixture is sucked into the chamber until the ports have reached the position in FIGURE 23, in which the internal volume of chamber $CV_1$ is at its maximum. The continued rotation is shown in FIGURE 24 and starts the compression stroke. The inlet channel E is closed by the end face of the inner rotor. FIGURES 25 and 26 illustrate different phases of the compression cycle or stroke in which the gas in chamber $CV_1$ is being compressed until the position shown in FIGURE 27 is reached at which time the channel 36' permits the gases to flow past the adjacent point of least radius on the outer body and it is in this position that ignition occurs as indicated by the flash arrow Z. The position of the rotors in FIGURE 27 also corresponds to a top dead center position in a reciprocating engine. The working stroke follows ignition and the initial part of this stroke is shown in FIGURE 28 in which the pressure built up between the outer rotor and the inner rotor acts radially on the inner rotor and the pressure in the working chamber $CV_1$ will have a vector eccentric to axis $M_1$ tending to rotate the outer rotor clockwise. During the working stroke between the phases shown in FIGURES 29 and 30 the transfer channel U connects the working chamber $CV_1$ with the adjacent working chamber $CV_2$. FIGURES 31 and 32 show a simultaneous increase in the volume of chambers $CV_1$ and $CV_2$ which are in communication with one another by means of the recess or transfer passage U. When the combined volume of the two chambers $CV_1$ and $CV_2$ has reached a maximum value, FIGURE 32, exhaust channel or port A is open and the expanding combustion gases are discharged in the direction of the arrow. FIGURE 34 illustrates the exhausting from chamber $CV_2$ while chamber $CV_1$ is again closed and in that chamber is effected a re-compression of the remaining exhaust gases which in the phase position of FIGURE 35 has been increased to such an extent that upon overflow from the now expanding chamber $CV_4$, between the positions shown in FIGURES 35 and 36, there is approximately equal pressure existing in chambers $CV_1$ and $CV_2$. In the meantime chamber $CV_4$ is open to exhaust port A, FIGURES 36 and 37. From the position shown in FIGURE 37 which corresponds to position of FIGURE 19 the working cycle is repeated as regards chamber $CV_2$, FIGURE 38 being similar to FIGURE 20. In this cycle of operation the transfer channel U functions to provide for prolonged expansion following ignition, i.e. during the working stroke. In other words assuming the gases ignited in chamber $CV_1$ during the working stroke in this chamber the gases can expand into chamber $CV_2$, and further following ignition of the gases in chamber $CV_4$ during that working stroke gases can expand into chamber $CV_1$ so that there are in effect six strokes in the working cycle. FIGURE 36 diagrammatically illustrates the position of the rotors at which the spark plug can be removed.

As in the case of the engine in FIGURES 1 and 2 the form of engines shown in FIGURES 17 and 18 can be constructed in the form in which the outer component having an inner periphery in the shape of a 3-lobed epitrichoid is stationary and the inner component or rotor is mounted on an eccentric so as to perform a planetary movement within the outer component.

In FIGURE 39 is shown an engine having a stationary housing generally denoted at 45 which includes a peripheral shell structure 46 and end walls 47 and 48 having parallel facing surfaces. In this FIGURE 39 for purposes of clarity the section through the housing is taken through the outlet port. The inner surface 49 of the shell, FIGURE 40, is in the form of a 3-lobed epitrichoid. A shaft 50 is journalled in a ball bearing 51 supported in an opening in end wall 48 and by needle bearing 52 suitably supported in an opening in end wall 47. The median portion of shaft 50 mounts an eccentric 53 and a rotor 54 is supported on this eccentric by further needle bearings 55. Counter-weights 56 are keyed to shaft 50, and a gear 57 mounted on one end of this shaft is in mesh with an additional gear 58 fixed to the output shaft 59. This shaft 59 is supported by ball bearings 62, 63 within a transmission casing 60, 61 suitably bolted or otherwise fastened to the end wall 47 of housing 45. The rotor 54 carries an internally toothed gear 64 that is in mesh with a spur wheel or gear 65 fixed to the end wall 47. As in the preceding modifications the relative movement between rotor and body or housing is determined by the number of apex portions relative to the number of lobe-defining portions. In this instance, for each complete revolution of rotor 54 about its own axis, the shaft 50 turns four revolutions in the same direction. The dimension or teeth ratio of gears 64 and 65 permanently maintains this speed ratio. Suitable end face sealing plates 66 are carried by the inner rotor and edge seal means 67 are mounted at the apex portions of rotor 54. The seals 67 and 66 making sealing contact with the inner surface 49 of the housing and the inner surface of the facing side walls of the housing respectively.

The side walls 47 and 48 and the peripheral wall or shell 46 are provided with conduits 68 through which a cooling medium means can be circulated from inlet 69 to outlet 70. A carburetor and duct system, not shown, communicates with an intake conduit 76' terminating in opening 76, FIGURE 40, and exhaust duct 71 communicates with an outlet or exhaust opening 77. In this form of the invention there is an inlet port 74 in side wall 47 for the inflow of scavenging air and an outlet 75 for the scavenging air. A spark plug 73 is mounted in a stepped bore in side wall 47 and has its electrode within a circular recess, see FIGURE 41. This recess and thus the location of the spark plug is near one of the points of least radius of the inner surface 49 and is close to that surface. Further the aperture for the spark plug electrode is located in advance of that one point of least radius as regards the movement of successive apex portions past the aperture and the size of the aperture bears such relation to the size of the electrode that the circular space betwen the electrode and the metal of the end wall 47 is restricted but is sufficient to provide an effective spark gap. Further the port means 74 and 75 constitute additional port means associated with the outer body or housing at a location circumferentially spaced from the outlet port 77 as regards the direction of movement of the apex portions past the exhaust gas outlet port, and these port means 74 and 75 are arranged to establish a scavening cycle between consecutive working cycles. Also it is pointed out that both of the ports 74 and 75 communicate with the interior of the outer body or housing within circumference of one lobe L' of the epitrochoid.

Suitable current conducting and timing components, not shown, provide the necessary voltage current for the spark plug 73 in accordance with the cycle of operation.

As in the case with the preceding modifications the side surfaces of the rotor 54 are provided with channels or troughs 78 positioned and dimensioned to provide for a suitable compression ratio for the engine and for the flow of gas past the points of least radius such as LR, FIGURE 40.

The working cycle of this engine provides for an induction phase wherein fuel-air mixture enters through inlet port 76, a compression phase, an ignition phase and an expansion or working stroke and an exhaust through port 77 and then prior to the next induction phase there is an inflow of cooling air through port or duct 74 and the exhaust thereof through port 75. In this form of the invention all of the ports and the spark plug are mounted in the end faces of the housing.

The same working cycle can be obtained with an engine of the type shown in FIGURES 17 and 18 provided suitable ports for the inflow and outflow of cooling air are associated with the outer body. Such an engine is diagramatically illustrated in FIGURES 42 to 49. With this engine a scavenging inlet port SE is cut in one end face of the outer rotor 38 and an exhaust passage for scavenging air extends through the periphery of the outer rotor as shown at SA. FIGURES 42 to 49 illustratate the conditions within chamber $AV_1$ following the exhaust stroke. In FIGURE 42 this chamber has its minimum volume and is in communication with gas exhaust passage A as well as with scavenging air inlet passage SE. In FIGURES 43 and 44 the air inlet SE becomes progressively larger until it reaches a maximum between the phase positions of FIGURES 44 and 45 at which latter position the scavenging air exhaust port SA has been opened so that the cooling air used for cooling chamber $AV_1$ is expelled. This scavenging process continues during the phase positions shown in FIGURES 46 to 49. Following this phase position the engine moves into the position equivalent to top dead center in which chamber $AV_1$ is again of minimum volume and is in communication with both scavenging air exhaust port SA and fuel inlet port or channel means E. The phase position of chamber $AV_1$ following its position of FIGURE 49 corresponds to the phase position of chamber $CV_1$ in FIGURE 19, following which the normal 4-cycle operation takes place.

In certain of the modifications illustrated, the downstream end or port of the intake passage is in an end wall of the outer body or rotor, as in FIGS. 1–2, 17–18 and 40–41, and said port has a portion which extends outwardly to a point adjacent to the inner surface of the peripheral wall of the outer body or rotor. In FIGS. 15–16, however, the intake passage extends through the peripheral wall so that the entire intake port not only is adjacent to the inner surface of said wall but is in said surface. As used herein a description of the port as having at least a portion disposed adjacent to the peripheral wall is intended to be broad enough to describe either arrangement. With either arrangement a large intake port area is possible. Similarly the exhaust port may be in the peripheral wall of the outer body or rotor, as in FIGS. 1–2, 15–16 and 17–18, so that the entire port is adjacent to the peripheral wall, or the exhaust port may be disposed in an end wall of said outer body or rotor, as in FIGS. 40–41, with said port having a portion disposed adjacent to said peripheral wall inner surface.

From the foregoing description of various operative forms of engines which are of particular shapes, the result is an effective rotary internal combustion engine having a low weight per horse power. We have found, however, that in order to achieve the optimum overall effectiveness and economy in an engine of this type, it is necessary to take into consideration the critical factors which contribute to such effectiveness and economy, such as:

A. A large displacement volume.

B. An adequately high compression ratio.

C. The proper effective size of the intake passage means.

D. Proper relationship between the seal means at the apices of the inner rotor and the inner contour of the outer body.

E. The proper effective dimensions for the shaft carrying the inner component or rotor so as to minmize or limit bending.

F. The effect of friction on the bearings or journals for the rotating component or components.

Some of these factors have their equivalent in the reciprocating engine field but others are peculiar to the rotary engine of this invention, such as factor D. Furthermore, when dealing with rotary engines in which the outer component is a 2- or 3-lobed epitrochoid and the inner component corresponds approximately to the inner envelope of such epitrochoid, the compliance with all of factors A to F gives rise to conflicting requirements as regards the shapes of these two main engine components. Therefore, only certain critical dimensions lying within a rather narrow range of shapes, will permit the construction of an efficient and effective rotary engine of this type.

The peculiar shape of the epitrochoid is determined by the number of lobes and the relationship between the maximum distance from the center of the epitrochoid to its periphery compared with the minimum distance from said center to the periphery expressed as a ratio of $a/b$ in which $a$ is the maximum distance and $b$ is the minimum distance. This ratio governs the overall operating efficiency of the engine. FIGURES 50 to 54 clearly establish the meaning of distances of $a$ and $b$ and the effect of the ratio $a/b$ on the shape of the 2-lobed epitrochoid. The shape of the epitrochoid may be looped as in FIGURE 50 where $a/b$ equals 3.5, it may be inwardly pointed as in FIGURE 51 where $a/b$ equals 2, it may be inwardly bent as in FIGURE 52 with $a/b$ equal 1.5, somewhat elongated as in FIGURE 53 where $a/b=1.25$, or outwardly bent as in FIGURE 54 where $a/b=1.15$. A contour or shape such as in FIGURE 50 cannot be used to construct an engine. Therefore, within all the theoretically possible epitrochoidal curves there are definite restrictions as to those that can be utilized in the construction of a rotary internal combustion engine. In FIGURES 51 to 54 the inner rotor is shown as having the contour of the inner envelope of the epitrochoidal curve.

In the construction of the rotary engine in accordance with this invention the factors A to F are governed by the shape of the epitrochoid and thus they depend on the ratio $a/b$. The various factors have been carefully analysed and calculated in connection with many different shapes of the inner surface of an outer body. All the epitrochoids illustrated have identical maximum radius from center to the furthest point in the periphery $a$ but different minimum distance $b$.

As regards factor A the displacement of each working chamber is the difference between the maximum volume, $V_{max}$ and the minimum volume $V_{min}$. This is illustrated in FIGURES 56 to 58. Assuming the length of the engine, i.e. the distance between opposite end faces of the outer component to be equal to 1 the areas between the inner surface of the trochoidal shape and the outer surface of rotor, eccentrically mounted within the same can be utilized as a basis for determining the displacement. As a result it can be seen that if ratio $a/b$ is increased the displacement grows until the maximum is reached at a ratio of $a/b=2$ as shown in FIGURE 51. The comparison between the displacement $V_4$ of the engine and the ratio $a/b$ is illustrated in the graph shown in FIGURE 68 which indicates the growth of the displacement curve up to a maximum where $a/b=2$. Therefore to obtain as large a displacement as possible with a fixed outer diameter of the rotary engine a large value of $a/b$ is desired.

On the other hand, the compression ratio factor B establishes a conflicting condition. The compression ratio is the ratio of the maximum area $V_{max}$ compared to the minimum area $V_{min}$, said areas being shown in FIGURES 56 to 58. The minimum area, however, is split into two separate areas, as shown in FIGURES 57 and 58, if the inner rotor is shaped exactly like the corresponding inner envelope. Since the permissible compression ratio of an internal combustion engine depends on the octane number of the fuel to be used, it follows that the maximum geometrically possible compression ratio cannot always be utilized in an engine. Further, in the case of a rotary engine of the type of this invention the maximum possible compression ratio cannot be utilized since it is necessary during the rotation of the rotor to allow for free flow of gas from one part of the minimum volume area to the other. Therefore the invention provides an additional volume $V_{Br}$ located in the inner rotor.

This volume $V_{Br}$ is that which exists between the outer contour of the inner envelope and the actual outer contour of the inner body; for example, the volume of the channels shown in the drawings. If the volume of the channels approximates the minimum volume $V_{min}$ of the working chamber (see Figures 57 and 58) the effective compression ratio E results as $$E = \frac{V_{max} + V_{min}}{2V_{min}}$$

Figure 69:
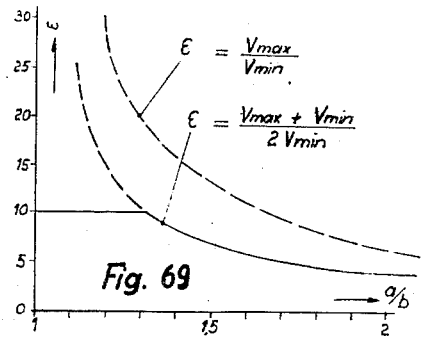

The diagram in FIGURE 69 illustrates the variation of the compression ratio $\epsilon$ as a function of the value $a/b$, both with and without the additional volume $V_{BR}$. It will be noted that if the fuel used dictates a compression ratio of not more than 10:1 and if the selected value of $a/b$ is smaller than 1.3, then the additional volume $V_{BR}$ provided in the outer face of the inner body must be larger than the volume $V_{min}$, as otherwise the compression ratio $\epsilon$ would exceed 10:1. As $a/b$ decreases the compression ratio increases and the eccentricity between the shaft axes decreases. It thus follows that the value of $a/b$ for an effective compression ratio must be small as compared to the value of $a/b$ required for a large displacement, these considerations being directly opposite and thus placing a restriction on the range of the value $a/b$.

Figure 59:
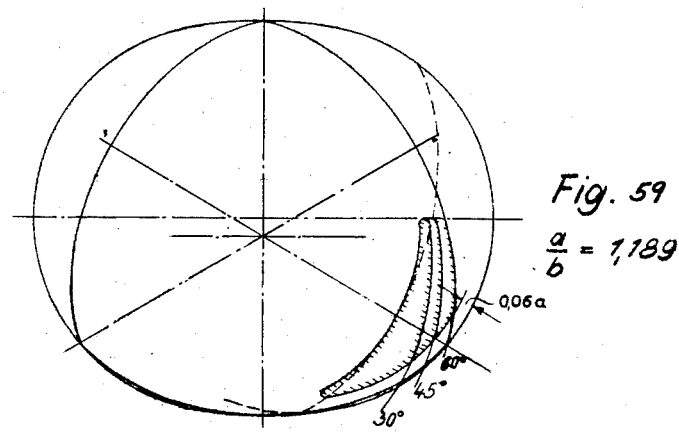
Figure 60:
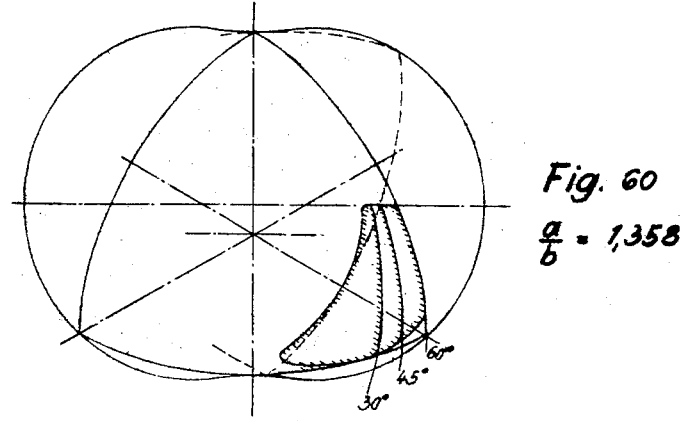
Figure 61:
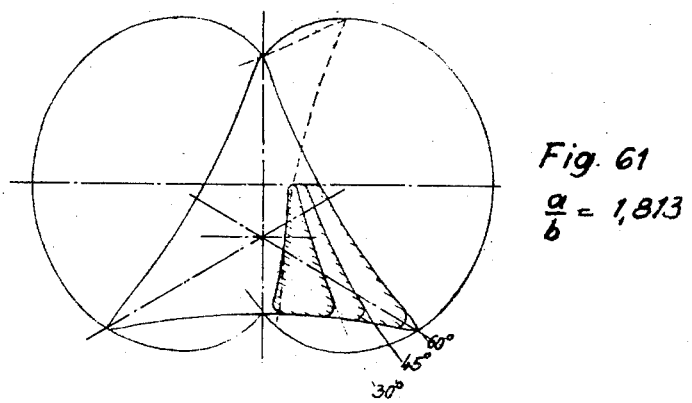

This range is further complicated by the fact that the engine is basically a 4-cycle engine with the intake and the exhaust being controlled solely by the relative movement of the inner body with respect to the outer body. The fuel-air mixture enters the working chambers through the precisely located recesses 30 of FIGS. 1 and 2 or ports 76 of FIGS. 39 and 40, in one or both end walls of the outer body, or through a peripheral port IP of FIGS. 15 and 16 in the outer body and the opening of these intake passage means is controlled by the relative movement of the inner body with respect to the outer. To determine the cross-sectional area $F_E$ of the intake passage means, Factor C, the timing selected for the opening and the closing of this passage must be considered. In FIGURES 59 to 61 the area $F_E$ is shown with several timings conventionally used in 4-cycle engines. In each case the inlet passage means opens not earlier than top dead center (which means when the working chamber has its minimum volume) and three timings for the intake closing are shown, namely 30°, 45° or 60° after bottom dead center. The edges or apex portions of the inner body or rotor that extend parallel to the axis must accommodate sealing elements which are in continuous sealing contact against the facing inner surfaces of the end walls of the outer body. In other words the sealing strips at the apex portions must not only seal against the inner peripheral surface of the outer body but they must seal at the corners between the end walls and the inner peripheral surface. To prevent these sealing strips from sliding axially out of their accommodating grooves and entering the intake passage means the boundary of this passage cannot extend to the inner periphery of the shell of the outer body. The distance between the inner circumference of the periphery of the outer body and the nearest edge of the intake passage has to be approximately $0.06a$. FIGURES 59 to 61 also illustrate in dotted lines the inner body or rotor in that phase position in which the maximum area of the intake passage means is exposed. From the showings in FIGURES 59 to 61 and from the diagram in FIGURE 71 it can be seen how the maximum effective cross-sectional area $F_E$ of the intake passage or port is dependent on the value of $a/b$.

Another factor, factor D, that requires consideration is the effectiveness of the sealing elements carried in grooves at the apex portions of the inner body. The grooves for accommodating the sealing elements are symmetrically arranged to extend inwardly from each apex and have identical extent in width on each side of the bisector of each apex. The bisector of the apex of the inner body or rotor is normal to the epitrochoid only at the time when it coincides with one of the main axes of the epitrochoid. In all intermediate positions there is an angle X between the line perpendicular to the epitrochoid and the bisector of the apex, FIGURES 56 and 58. The maximum value of this angle X is provided by the equation $$\sin = X(L+1)\frac{a-b}{a+b}$$

with L being the number of lobes of the epitrochoid. Considering the engine as an internal combustion engine it is necessary to provide a gas-tight connection between the outer body and the inner rotor. As stated, each apex of the inner rotor accommodates a sealing strip means of adequate shape in a strip accommodating groove. During the relative movement between the inner and the outer bodies the angular relationship between the inner surface of the outer body and the adjacent contacting surface of the sealing strip means varies by the angle X in both directions several times during each rotation. The diagram in FIGURE 67 illustrates the relationship between angle X and the ratio $a/b$. Thus if angle X is about 40° or more there is the danger that the sealing elements will be jammed between the inner surface of the trochoidal outer body and the side walls of the groove accommodating the sealing element. It thus follows that it is necessary to select a value of $a/b$ which results in maintaining the angle X within practical working limits.

Another factor, factor E, that is influenced by the value $a/b$ is the diameter of the shaft carrying the inner rotor. In view of the load placed on the shaft by the gas pressure it is necessary that the shaft be sufficiently robust. This factor again limits the shapes that can be utilized in a practical efficient engine. If the ratio $a/b$ is enlarged that results in weakening the shaft for the inner rotor. This is shown in FIGURES 62 to 65. The inter-relation between the value $a/b$ and the maximum possible shaft diameter $d_W$ for the inner rotor is illustrated in the diagram of FIGURE 66. If $a/b$ is equal to 1 the trochoid is circular and in this case $d_W$ can reach the value of $2a$. If $a/b$ is equal to 5/3, the value of $d_W$ is 0. In connection with this shaft size for the inner rotor it must be borne in mind that the shaft of the inner rotor is eccentric to the axis of the outer rotor, and thus this eccentricity also places a limiting factor on the shaft size. In addition the diameter of the inner rotor shaft must be reduced by double the value of the sealing overlap $S_1$ which is necessary to ensure an adequate sealing of the working chamber relative to the diameter of the opening D in the outer body that accommodates the eccentricity of the inner rotor shaft. FIGURES 62 and 63 are respective diagrammatic longitudinal and horizontal sections which illustrate the shape of the bodies when the ratio of $a/b$ is equal 1.35 and indicate an adequate diameter $d_W$ for the inner rotor shaft. FIGURES 64 and 65 are similar views illustrating the shape resulting from the ratio $a/b$ being equal to 1.55 and indicate the diameter $d_W$ resulting from this ratio of $a/b$. Thus as the ratio $a/b$ decreases the shaft size increases and vice versa.

The influence of the ratio $a/b$ on the effect of friction acting on the bearings, factor F, can be analysed on engines having identical outer diameters, identical output at the same speed which means that identical torques are involved. However, since the ratio $a/b$ is different in each engine, the length of the working chamber has to be altered in each case by an amount sufficient to ensure identical output. When ratio $a/b$ is enlarged the eccentricity of the axes of the bodies increases which means that the lever arm length of the torque is increasing and the required gas pressure P acting against the inner rotor surface is reduced in an inverse ratio. As a result of this the load on the bearings, the required diameter of the bearings and the peripheral speed of the shaft relative to the bearings are reduced thereby lowering the friction losses.

Therefore the factors just explained can be summarized as follows:

(1) In order to obtain a large displacement it is necessary to select a large ratio of $a/b$;

(2) To obtain a high compression ratio it is necessary to select a small value $a/b$;

(3) The size of the intake passage means in the end walls of the outer body reaches a maximum value or total effective area with a value of $a/b$ being within the range of 1.4 to 1.5;

(4) In order to provide for sufficient strength in the shaft for the inner rotor the value of ratio $a/b$ must be less than 1.6;

(5) In order to ensure that the angle between the line normal to the epitrochoid and the bisector of each apex does not exceed the limiting value for proper sealing, it is necessary to select the ratio $a/b$ as small as possible;

(6) In order to minimize friction losses as regards the bearings for the rotors it is desirable to select the ratio of $a/b$ as large as possible.

It is therefore seen that these requirements which partly contradict one another place certain limitations on the dimensions of an efficient practical rotary internal combustion engine which would be one that would have a high output with economic fuel consumption for a given overall size of the engine. As a measure of this overall size we select the volume $V_B$ of a circular cylinder, circumscribing the two or three points (depending on whether a 2-lobed or 3-lobed shape is under consideration) of the epitrochoidal cavity lying at a maximum distance from its center and having a length equal to the length $h$ of the working chambers longitudinally of the axis of the engine. It follows therefore that the total volume $V_B$ is equal to $a^2\pi h$. If one is furnished with an engine volume by predetermined values for $a$ and $h$ and a selected ratio for $a/b$, then for a particular 2-lobed or 3-lobed cavity all important technical data for the design of an efficient rotary internal combustion engine are provided. Therefore it is of decisive importance to select that value of the ratio $a/b$ which provides the most favorable engine as regards the aspects of high output and low fuel consumption. To arrive at a most desirable value of $a/b$, a plurality of engines must be compared which have the same volume but different values of $a/b$ so as to ascertain the maximum output N for each engine at full throttle.

By dividing the value of N by the corresponding value of the specific fuel consumption $b_e$ the quotient $$\frac{N}{b_e}$$

naturally characterizes the quality of the engine.

The output N is proportional to the product $V_H \cdot p_{me} \cdot n$. In this product $V_H$ is the displacement of the engine and is equal to the sum of the individual displacements of all working chambers, $p_{me}$ is the brake mean effective pressure, and $n$ is the rotational speed.

Figure 68:
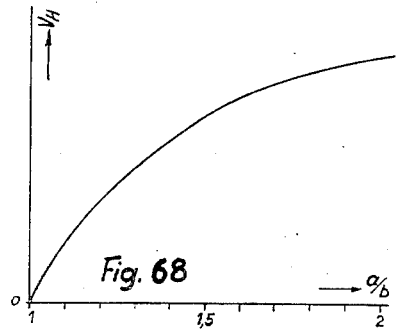

The dependency of $V_H$ on the ratio $a/b$ is illustrated in the diagram of FIGURE 68.

Figure 73:
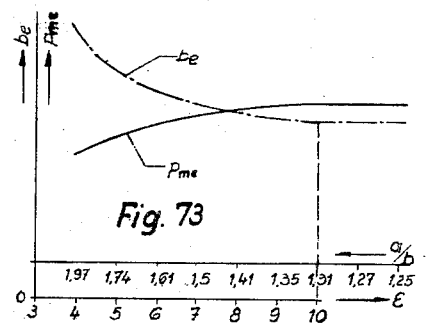

The possible mean effective pressure $p_{me}$ can be deduced from experience gained in analyses of reciprocating piston engines. Usually, other factors being equal, the mean effective pressure varies with compression ratio as shown in FIGURE 73. Inasmuch as the compression ratio varies with the value of $a/b$ according to the diagram FIGURE 69, there is a relationship between $p_{me}$ and $a/b$. This latter relationship can also be seen in the diagram of FIGURE 73. The relation between $p_{me}$ and $a/b$ has been replotted from FIG. 73 and shown in FIG. 70 with a linear scale for the quantity $a/b$ increasing to the right as in the other graphs. The maximum compression ratio was again limited to 10. Any further increase in the mean effective pressure which would theoretically be possible by further increasing the compression ratio is eliminated from consideration.

Figure 71:
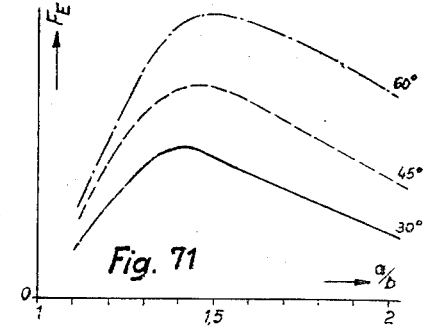
Figure 72:
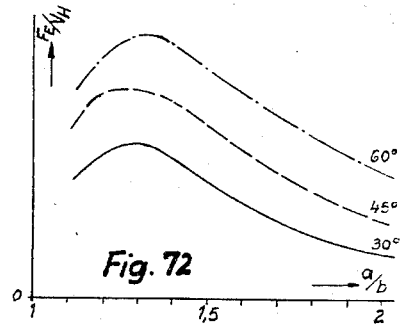

The value of the mean effective pressure, however, is dependent also on the "breathing" capacity of the engine, i.e. the ability of the engine to draw in a full charge of fuel-air mixture. This ability is dependent upon the area of the intake port $F_E$ in relation to the displacement $V_H$. The mean effective pressure $p_{me}$ is therefore a function of both compression ratio and breathing ability and the values of $p_{me}$ based on compression ratio alone (FIG. 73) are adjusted by multiplying by the ratio $F_E/V_H$. The relationship of $F_E$ and $a/b$ is shown in FIG. 71 and the relation between $V_H$ and $a/b$ may be seen in FIG. 68. FIG. 72 shows the relation between the quotient $F_E/V_H$ and the quotient $a/b$.

The rotary speed $n$ of rotary engines of this invention is not limited by inertia of any reciprocating masses such as piston and valves. The maximum speed is limited by other considerations, such as bearing speeds, centrifugal force exerted on the apex seals, etc., but in general the permissible maximum speed is largely independent of the value of $a/b$. Accordingly, the speed $n$ may be considered constant for the purpose of examining the effect of varying $a/b$.

Figure 70:
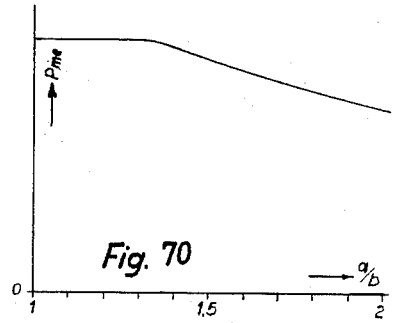
Figure 74:
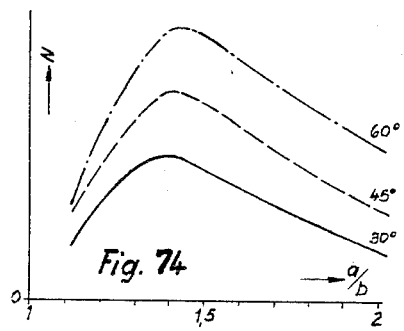

The multiplication of the values, obtained from the diagrams of FIGURES 68, 70 and 72 brings the result shown in FIGURE 74. As explained above this multiplication is a basis for the output that can be reached from the engine. The maximum output is a function of the ratio $a/b$ whereby the top values are possible when $a/b$ lies within the range of $a/b = 1.3$ to $1.5$.

In considering the matter of fuel consumption, use is made of experience in investigating comparable reciprocating internal combustion engines and the results are set forth in FIG. 73 which shows the specific fuel consumption $b_e$ as a function of compression ratio, and hence of $a/b$.

Figure 75:
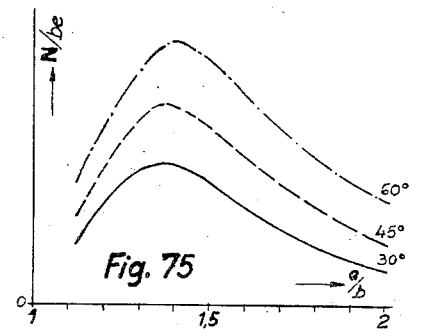

From these data the value of the quotient $N/b_e$ may be determined and its relationship to $a/b$ shown, as in FIG. 75, from which it is apparent that in an engine of this type (i.e., with a 2-lobed epitrochoid and 3-apexed inner rotor) top values of this quotient are likewise obtained with $a/b$ ratios lying in the range of 1.3 to 1.5.

This result was obtained by consideration of items 1, 2 and 3 of the requirements for a rotary engine of this type. When the somewhat conflicting requirements of items 4, 5 and 6 are included in the consideration, we have found that the value of $a/b$ should be kept within the range 1.25 to 1.50.

Extending the same considerations to an engine having its outer rotor shaped as a 3-lobed epitrochoid and with its inner rotor having four apex portions and a speed ratio of 4:3 it follows that in this case the optimum range of ratio $a/b$ is between 1.2 and 1.32.

In summation it is to be pointed out that some of the decisive factors which govern the construction of a rotary engine having certain dependencies on the value ratio $a/b$ make it desirable to utilize a large ratio of $a/b$ while others of these controlling factors require the utilization of a small value $a/b$. The present invention has taken into consideration these conditions that are directed in opposite directions and points out that the value of the ratio $a/b$ should be within a restricted range in order to control the construction of a rotary internal combustion engine of the epitrochoidal shape having optimum qualities.

At the same time this range of the ratio $a/b$ determines all other characteristics of such rotary engine so that by restricting the value of $a/b$ within the range taught by this invention, the most suitable proportions for the shape of the engine can be selected out of a multitude of possible proportions.

In connection with the control of the intake and exhaust processes by the relative movement of the inner body or component with respect to the outer body or component the expression "only one effective intake passage means" is to be interpreted broadly. Thus whether there is only one transfer channel means or recess in one end wall of the outer body, or only one inlet port through an end or peripheral wall of the outer body or whether there are two oppositely disposed similarly arranged channel means or recesses or inlet ports respectively, this expression is proper because, whether it be single or twin, this is the one passage means which feeds to each of the working chambers in turn as it reaches the intake phase.

What is claimed is:

1. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially of the axis of the outer body, said outer surface of the inner body including a plurality of apex portions spaced circumferentially about the axis of the inner body, said apex portions including edges parallel to the axis of the inner body engaging the inner surface of the outer body, said arched lobe-defining portions being two in number and the number of said apex portions being three, one of said bodies having only one effective intake passage means therein arranged to communicate with the space between the exterior of the inner body and the interior of the outer body for alternately feeding all said chambers, as the bodies relatively move, said outer body having an exhaust port also arranged to communicate with said space, said bodies being arranged to rotate relatively in a manner determined by the number of apex portions relative to the number of lobe-defining portions so that the cycle of operation of the engine is determined solely by the relative movement of the inner body with respect to the outer body, in which engine the relationship between the maximum distance from the center of the outer body to its periphery compared with the minimum distance from said center to the periphery, expressed as a ratio of $a/b$, in which $a$ is the maximum distance and $b$ is the minimum distance, is such that the value of said ratio of $a/b$ lies within the range of 1.25 to 1.5.

2. A rotary internal combustion engine having a cycle including the four strokes of intake, compression, expansion and exhaust and comprising an outer hollow body and an inner body supported for relative turning movement within the outer body, and turning on an axis eccentric of and parallel to the axis of the outer body, said bodies having respective facing surfaces defining a plurality of variable volume working chambers, said facing surfaces comprising the outer surface of the inner body and the inner surface of the outer body which includes a plurality of arched lobe-defining portions spaced circumferentially of the axis of the outer body, said outer surface of the inner body including a plurality of apex portions spaced circumferentially about the axis of the inner body, said apex portions including edges parallel to the axis of the inner body engaging the inner surface of the outer body, said arched lobe-defining portions being three in number and the number of said apex portions being four, one of said bodies having only one effective intake passage means therein arranged to communicate with the space between the exterior of the inner body and the interior of the outer body for alternately feeding all said chambers, as the bodies relatively move, said outer body having an exhaust port also arranged to communicate with said space, said bodies being arranged to rotate relatively in a manner determined by the number of apex portions relative to the number of lobe-defining portions so that the cycle of operation of the engine is determined solely by the relative movement of the inner body with respect to the outer body, in which engine the relationship between the maximum distance from the center of the outer body to its periphery compared with the minimum distance from said center to the periphery, expressed as a ratio of $a/b$, in which $a$ is the maximum distance and $b$ is the minimum distance, is such that the value of said ratio of $a/b$ lies within the range of 1.2 to 1.32.

3. A rotary internal combustion engine having a cycle which includes the four phases of intake, compression, expansion and exhaust; said engine comprising an outer body having spaced end walls and a peripheral wall interconnecting said end walls to define, between said walls, a cavity having an axis along which said end walls are spaced, the inner surface of said peripheral wall having basically the profile of a multi-lobed epitrochoid with its lobes being spaced circumferentially about said axis; an inner body received within said outer body cavity and supported for relative rotation with respect to said outer body with the axis of said inner body being laterally spaced from, but parallel to, the axis of said outer body cavity, said inner body having axially-spaced end faces disposed adjacent to and in sealing engagement with said end walls and having an outer surface with a plurality of circumferentially spaced apex portions, one more in number than the number of said lobes, each of said apex portions having its radially outermost edge disposed substantially at said peripheral wall inner surface in all relative positions of said inner and outer bodies, said apex portions having continuous sealing engagement with said peripheral wall inner surface such that the space between the facing surfaces of said inner and outer bodies is divided into a plurality of working chambers which individually vary in volume upon relative rotation of the inner body with respect to the outer body, each portion of the outer surface of the inner body between a pair of adjacent apex portions being such that the adjacent working chamber extends from one of said apex portions to the other in all relative positions of the two bodies; intake passage means having a port opening into said space for consecutively individually inducting a charge of a working fluid into all of said chambers as said inner body relatively rotates with respect to the outer body; and exhaust passage means having a port opening into said space for consecutively individually exhausting all of said chambers as said inner body relatively rotates with respect to the outer body.

4. A rotary internal combustion engine as claimed in claim 3 and including gear means mechanically coupling said inner and outer bodies together.

5. A rotary internal combustion engine as claimed in claim 3 and in which said outer body is stationary and said inner body performs a planetary movement with respect to said outer body.

6. A rotary internal combustion engine as claimed in claim 5 and including gear means mechanically coupling said inner and outer bodies together, said gear means comprising an internal gear co-axial with and secured to the inner body and a gear meshing with said internal gear and secured to said stationary outer body.

7. A rotary internal combustion engine as claimed in claim 3 and in which the number of lobe-defining portions is two and the number of apex portions is three.

8. A rotary internal combustion engine as claimed in claim 3 and in which both said outer body and said inner body rotate in the same direction on fixed, spaced, parallel axes, the ratio of the rotational speed of the outer body to the rotational speed of the inner body being equal to the ratio of the number of apex portions to the number of lobe-defining portions.

9. A rotary internal combustion engine as claimed in claim 8 and in which said exhaust passage means extends through the peripheral wall of the outer body, the outer end of said passage means being in trailing relation to the inner end with respect to the direction of rotation of said outer body.

10. A rotary internal combustion engine as claimed in claim 3 and in which said intake passage means includes a passage through the inner body communicating at its downstream end with a recess in at least one of the axially-spaced end walls of the outer body.

11. A rotary internal combustion engine as claimed in claim 3 and including a hollow shaft supporting said inner body, a recess in at least one of the axially-spaced end walls of the outer body and a passage through the inner body communicating at one end with the interior of said hollow shaft and at the other end with said recess such that said passage and recess constitute said intake passage means.

12. A rotary internal combustion engine as claimed in claim 3 and in which the number of lobe-defining portions is three and the number of apex portions is four.

13. A rotary internal combustion engine as claimed in claim 12 and including, in addition to said intake passage means and said exhaust passage means, an air inlet passage and an air outlet passage each extending through the outer body and communicating with the space between the inner and outer bodies.

14. A rotary internal combustion engine as claimed in claim 13 and in which both of said air inlet and air outlet passages communicate with said space within the confines of one and the same lobe of said epitrochoid.

15. A rotary internal combustion engine as claimed in claim 3 and in which said intake port and said exhaust port each has at least a portion disposed adjacent to said epitrochoidal inner surface of said peripheral wall.

16. A rotary internal combustion engine as claimed in claim 15 and in which said exhaust passage means extends through said peripheral wall.

17. A rotary internal combustion engine as claimed in claim 15 and in which said intake passage means extends through said peripheral wall.

18. A rotary internal combustion engine as claimed in claim 15 and in which said intake passage means and said exhaust passage means both extend through said peripheral wall.

19. A rotary internal combustion engine as claimed in claim 3 and in which said epitrochoidal inner surface has two lobes and said inner body has three apex portions and said epitrochoidal inner surface has a shape such that the ratio of $a$ to $b$, where $a$ is the maximum distance and $b$ is the minimum distance from the center of the epitrochoid to said inner surface, lies within the range of 1.25 to 1.5.

20. A rotary internal combustion engine as claimed in claim 3 and in which said epitrochoidal inner surface has three lobes and said inner body has four apex portions and said epitrochoidal inner surface has a shape such that the ratio of $a$ to $b$, where $a$ is the maximum distance and $b$ is the minimum distance from the center of the epitrochoid to said inner surface, lies within the range of 1.2 to 1.32.

21. A rotary internal combustion engine having a cycle which includes the four phases of intake, compression, expansion and exhaust; said engine comprising an outer body having spaced end walls and a peripheral wall interconnecting said end walls to define, between said walls, a cavity having an axis along which said end walls are spaced, the inner surface of said peripheral wall having basically the profile of a multi-lobed epitrochoid with its lobes being spaced circumferentially about said axis and having, at the junction of said lobes, portions of least radius from said outer body axis; an inner body received within said outer body cavity and supported for relative rotation with respect to said outer body with the axis of said inner body being laterally spaced from, but parallel to, the axis of said outer body cavity, said inner body having axially-spaced end faces disposed adjacent to and in sealing engagement with said end walls and having an outer surface with a plurality of circumferentially spaced apex portions, one more in number than the number of said lobes, each of said apex portions having its radially outermost edge disposed substantially at said peripheral wall inner surface in all relative positions of said inner and outer bodies and said apex portions having continuous sealing engagement with said peripheral wall inner surface such that the space between the facing surfaces of said inner and outer bodies is divided into a plurality of working chambers which individually vary in volume upon relative rotation of the inner body with respect to the outer body, each portion of the outer surface of the inner body between a pair of adjacent apex portions being such that the adjacent working chamber extends from one of said apex portions to the other in all relative positions of the two bodies; intake passage means having a port opening into said space within the confines of a first of said lobes in a region thereof adjacent to one of said inner surface portions of least radius for consecutively individually inducting a charge of a working fluid into all of said chambers as said inner body relatively rotates with respect to the outer body such that each chamber compresses its charge of working fluid for subsequent ignition of its charge adjacent to another of said inner surface portions of least radius; and exhaust passage means formed in the outer body and having a port opening into said space within the confines of a second of said lobes in a region thereof adjacent to one of said portions of least radius for consecutively individually exhausting all of said chambers as said inner body relatively rotates with respect to the outer body.

22. A rotary internal combustion engine as claimed in claim 21 and in which said epitrochoidal inner surface has two lobes, said inner body has three apex portions and said intake and exhaust ports are adjacent to one and the same portion of least radius.

23. A rotary internal combustion engine as claimed in claim 21 and in which said epitrochoidal inner surface has three lobes and said inner body has four apex portions.

24. A rotary internal combustion engine as claimed in claim 23 and including a transfer channel in said peripheral wall circumferentially traversing one of said peripheral wall portions of least radius to provide communication between the adjacent lobes.

25. A rotary internal combustion engine as claimed in claim 23 and in which said intake and exhaust ports are adjacent to one and the same peripheral wall portion of least radius and said ignition takes place adjacent to a second of said portions of least radius, and including a transfer channel in said peripheral wall circumferentially traversing the third peripheral wall portion of least radius to provide communication between said second lobe and the third lobe.

26. A rotary internal combustion engine as claimed in claim 21 and in which, upon relative rotation of said inner body with respect to said outer body, said intake port communicates with each working chamber during the intake phase of each working cycle of said chamber and, following each such communication, said exhaust port communicates with the same working chamber during the exhaust phase of the same cycle for said chamber, said intake and exhaust ports being disposed adjacent to one and the same peripheral wall portion of least radius with at least a major portion of said intake port being beyond said peripheral wall portion of least radius with respect to the direction of rotation of the inner body relative to the outer body and with at least a major portion of said exhaust port being on the opposite side of said portion of least radius.

27. A rotary internal combustion engine as claimed in claim 21 and including ignition means comprising a plurality of spark plugs carried by the inner body and corresponding in number to the number of said apex portions, there being one spark plug between each pair of adjacent apex portions and having its electrode means exposed to the working chamber between said pair.

28. A rotary internal combustion engine as claimed in claim 21 and including an aperture in said outer body adjacent to the inner surface portion of least radius adjacent to which ignition takes place; and a spark plug carried by the outer body and having an electrode within the confines of said aperture.

29. A rotary internal combustion engine having a cycle which includes the four phases of intake, compression, expansion and exhaust; said engine comprising an outer body having spaced end walls and a peripheral wall interconnecting said end walls to define, between said walls, a cavity having an axis along which said end walls are spaced, the inner surface of said peripheral wall having a multi-lobed profile with its lobes being spaced circumferentially about said axis and having, at the junctions of said lobes, portions of least radius from said outer body axis; an inner body received within said outer body cavity and supported for relative rotation with respect to said outer body with the axis of said inner body being laterally spaced from, but parallel to, the axis of said outer body cavity, said inner body having axially-spaced end faces disposed adjacent to and in sealing engagement with said end walls and having an outer surface with a plurality of circumferentially spaced apex portions, one more in number than the number of said lobes, each of said apex portions having its radially outermost edge disposed substantially at said peripheral wall inner surface in all relative positions of said inner and outer bodies; sealing strip means carried by the inner body at the radially outermost edge of each of said apex portions for continuous sealing engagement with the peripheral wall inner surface of the outer body to divide the space between said inner surface and the outer surface of the inner body into a plurality of working chambers which individually vary in volume upon relative rotation of the inner body with respect to the outer body, each portion of the outer surface of the inner body between a pair of adjacent apex portions being such that the adjacent working chamber extends from one of said apex portions to the other in all relative positions of the two bodies; intake passage means having a port opening into said space within the confines of a first of said lobes in a region thereof adjacent to one of said inner surface portions of least radius for consecutively individually inducting a charge of a working fluid into all of said chambers as said inner body relatively rotates with respect to the outer body such that each chamber compresses its charge for subsequent ignition of its charge adjacent to another of said inner surface portions of least radius; and exhaust passage means having a port opening into said space within the confines of a second of said lobes adjacent to one of said inner surface portions of least radius for consecutively individually exhausting all of said chambers as said inner body relatively rotates with respect to the outer body, each of said ports having at least a portion disposed adjacent to said peripheral wall inner surface.

30. A rotary internal combustion engine as claimed in claim 29 and in which at least the major portions of said intake port and said exhaust port are disposed adjacent to and on opposite sides of one and the same portion of least radius and each communication of said intake port with a working chamber is followed by communication of said exhaust port with the same chamber in the same working cycle of said chamber.

31. A rotary internal combustion engine as claimed in claim 29 and in which each portion of the outer surface of the inner body between a pair of adjacent apex portions has a channel between said apex portions, each said channel having a width less than that of said inner body such that the sides of said channel are spaced from the end faces of the inner body.

32. A rotary internal combustion engine as claimed in claim 29 and in which the exhaust port is in the inner surface of the peripheral wall of the outer body.

33. A rotary internal combustion engine as claimed in claim 29 and in which the intake port is in the inner surface of the peripheral wall of the outer body.

34. A rotary internal combustion engine as claimed in claim 29 and in which said intake port and said exhaust port are both in the inner surface of the peripheral wall of the outer body.

35. A rotary internal combustion engine as claimed in claim 29 and including a spark plug received in a recess in the outer body adjacent to the peripheral wall portion of least radius adjacent to which said ignition takes place, said spark plug recess communicating at its inner end with the space between said bodies and said inner end of said recess being restricted.

36. A rotary internal combustion engine as claimed in claim 29 and including a spark plug received in a recess in the outer body communicating at its inner end with said space between the inner and outer bodies at a point somewhat beyond the peripheral wall portion of least radius adjacent to which said ignition takes place.

37. A rotary internal combustion engine having a cycle which includes the four phases of intake, compression, expansion and exhaust; said engine comprising an outer body having spaced end walls and a pheripheral wall interconnecting said end walls to define, between said walls, a cavity having an axis along which said end walls are spaced, the inner surface of said peripheral wall having basically the profile of a two-lobed epitrochoid with its lobes being spaced circumferentially about said axis and having, at the junctions of said lobes, portions of least radius from said outer body axis; an inner body received within said outer body cavity and supported for relative rotation with respect to said outer body with the axis of said inner body being laterally spaced from, but parallel to, the axis of said outer body cavity, said two-lobed inner surface having a shape such that the ratio of $a$ to $b$, where $a$ is the maximum distance and $b$ is the minimum distance from said outer body axis to said inner surface, lies within the range of 1.25 to 1.5, said inner body having axially-spaced end faces disposed adjacent to and in sealing engagement with said end walls and having an outer surface with three apex portions, each of said circumferentially spaced apex portions having its radially outermost edge disposed substantially at said peripheral wall inner surface in all relative positions of said inner and outer bodies and said apex portions having continuous sealing engagement with the peripheral wall inner surface of the outer body to divide the space between said inner surface and the outer surface of the inner body into a plurality of working chambers which individually vary in volume upon relative rotation of the inner body with respect to the outer body; intake passage means having a port opening into said space for consecutively, individually inducting a charge of a working fluid into all of said chambers as said inner body relatively rotates with respect to the outer body; and exhaust passage means having a port opening into said space for consecutively individually exhausting all of said chambers as said inner body relatively rotates with respect to the outer body.

38. A rotary internal combustion engine having a cycle which includes the four phases of intake, compression, expansion and exhaust; said engine comprising an outer body having spaced end walls and a pheripheral wall interconnecting said end walls to define, between said walls, a cavity having an axis along which said end walls are spaced, the inner surface of said peripheral wall having basically the profile of a three-lobed epitrochoid with its lobes being spaced circumferentially about said axis and having at the junctions of said lobes, portions of least radius from said outer body axis; an inner body received within said outer body cavity and supported for relative rotation with respect to said outer body with the axis of said inner body being laterally spaced from, but parallel to, the axis of said outer body cavity, said three-lobed inner surface having a shape such that the ratio of $a$ to $b$, where $a$ is the maximum distance and $b$ is the minimum distance from said outer body axis to said inner surface, lies within the range of 1.2 to 1.32, said inner body having axially-spaced end faces disposed adjacent to and in sealing engagement with said end walls and having an outer surface with four apex portions, each of said circumferentially spaced apex portions having its radially outermost edge disposed substantially at said peripheral wall inner surface in all relative positions of said inner and outer bodies and said apex portions having continuous sealing engagement with the peripheral wall inner surface of the outer body to divide the space between said inner surface and the outer surface of the inner body into a plurality of working chambers which vary individually in volume upon relative rotation of the inner body with respect to the outer body; intake passage means having a port opening into said space for consecutively individually inducting a charge of a working fluid into all of said chambers as said inner body relatively rotates with respect to the outer body; and exhaust passage means having a port opening into said space for consecutively individually exhausting all of said chambers as said inner body relatively rotates with respect to the outer body.

References Cited in the file of this patent

UNITED STATES PATENTS

| | | |
|---|---|---|
| 724,994 | Cooley | Apr. 7, 1903 |
| 1,636,486 | Planche | July 19, 1927 |

FOREIGN PATENTS

| | | |
|---|---|---|
| 853,807 | France | Dec. 16, 1939 |
| 1,125,876 | France | July 16, 1956 |
| 1,133,762 | France | Nov. 19, 1956 |
| 951,600 | Germany | Oct. 31, 1956 |
| 583,035 | Great Britain | Dec. 5, 1946 |
| 777,675 | Great Britain | June 26, 1957 |
| 540,994 | Italy | Mar. 16, 1956 |
| 544,366 | Italy | June 14, 1956 |

OTHER REFERENCES

"Bauart und gegenwartiger Entwicklungsstand einer Trochoiden-Rotationskolbenmaschine" (Wankel et al.), published in MTZ, by Franckh'sche Verlagshandlung (Stuttgart), February 1960.